(12) United States Patent
Seo et al.

(10) Patent No.: US 11,567,619 B2
(45) Date of Patent: Jan. 31, 2023

(54) ELECTRONIC DEVICE

(71) Applicant: Samsung Display Co., Ltd., Yongin-si (KR)

(72) Inventors: Suyul Seo, Incheon (KR); Jaseung Ku, Seoul (KR); Suin Kim, Asan-si (KR); Jongin Baek, Hwaseong-si (KR); Gi-Na Yoo, Cheonan-si (KR); Jaeik Lim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/228,437

(22) Filed: Apr. 12, 2021

(65) Prior Publication Data

US 2021/0405819 A1  Dec. 30, 2021

(30) Foreign Application Priority Data

Jun. 26, 2020 (KR) .......................... 10-2020-0078738

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05); *G06F 2203/04111* (2013.01)

(58) Field of Classification Search
None
See application file for complete search history.

(56) References Cited

U.S. PATENT DOCUMENTS

| | | | |
|---|---|---|---|
| 8,976,150 B2 | 3/2015 | Lee | |
| 9,830,025 B2 | 11/2017 | Han et al. | |
| 9,904,365 B2 | 2/2018 | Son et al. | |
| 2014/0078106 A1* | 3/2014 | Yao | G06F 3/0443 345/174 |
| 2014/0152915 A1* | 6/2014 | Lu | G06F 3/0443 349/12 |

(Continued)

FOREIGN PATENT DOCUMENTS

| KR | 10-2015-0080228 A | 7/2015 |
|---|---|---|
| KR | 10-1872255 B1 | 8/2018 |

(Continued)

*Primary Examiner* — Duane N Taylor, Jr.
(74) *Attorney, Agent, or Firm* — Lewis Roca Rothgerber Christie LLP

(57) ABSTRACT

An electronic device, includes: a sensor layer detecting a touch input and an input-device input; and a sensor control circuit providing the sensor layer with a signal and receiving a detection signal from the sensor layer, wherein the sensor layer includes: a first electrode extending along a first direction; a second electrode extending along the first direction; a first cross electrode extending along a second direction intersecting the first direction; and a second cross electrode extending along the second direction, wherein the sensor control circuit detects the touch input based on a variation in mutual capacitance between the first electrode and the first cross electrode, and the sensor control circuit detects the input-device input based on a variation in capacitance of at least one selected from the first electrode, the second electrode, the first cross electrode, and the second cross electrode.

22 Claims, 23 Drawing Sheets

(56) References Cited

U.S. PATENT DOCUMENTS

| | | | |
|---|---|---|---|
| 2015/0179122 A1 | 6/2015 | Brown et al. | |
| 2019/0384454 A1* | 12/2019 | Fujii | G06F 3/0446 |
| 2020/0089363 A1 | 3/2020 | Jo et al. | |
| 2020/0117290 A1 | 4/2020 | Kremin et al. | |
| 2021/0223916 A1* | 7/2021 | Zheng | G06F 3/0443 |
| 2021/0342036 A1* | 11/2021 | Chen | G06F 3/0446 |

FOREIGN PATENT DOCUMENTS

| | | |
|---|---|---|
| KR | 10-2019-0104816 A | 9/2019 |
| KR | 10-2019-0105292 A | 9/2019 |
| KR | 10-2081606 B1 | 2/2020 |

* cited by examiner

ELECTRONIC DEVICE

CROSS-REFERENCE TO RELATED APPLICATION

The present application claims priority to and the benefit of Korean Patent Application No. 10-2020-0078738 filed on Jun. 26, 2020 in the Korean Intellectual Property Office, the entire disclosure of which is incorporated herein by reference in its entirety.

BACKGROUND

1. Field

Aspects of some example embodiments of the present disclosure relate to an electronic device that detects an input from an input device.

2. Description of the Related Art

An electronic device may detect an external input that is applied from an external source of the electronic device. The external input may be a user's input, for example, from the user's body part, light, heat, pen, pressure, or various other types of external input. The electronic device may use electromagnetic resonance (EMR) or active electrostatic (AES) to recognize coordinate information of a pen.

The above information disclosed in this Background section is only for enhancement of understanding of the background and therefore the information discussed in this Background section does not necessarily constitute prior art.

SUMMARY

Aspects of some example embodiments of the present disclosure may include an electronic device that detects an input from an input device.

According to some example embodiments of the present disclosure, an electronic device may include: a display layer; a sensor layer on the display layer, the sensor layer detecting a touch input and an input-device input; and a sensor control circuit that provides the sensor layer with a signal and receives a detection signal from the sensor layer. The sensor layer may include: a first electrode that extends along a first direction; a second electrode that extends along the first direction; a first cross electrode that extends along a second direction intersecting the first direction; and a second cross electrode that extends along the second direction. The sensor control circuit may detect the touch input based on a variation in mutual capacitance between the first electrode and the first cross electrode. The sensor control circuit may detect the input-device input based on a variation in capacitance of at least one selected from the first electrode and the second electrode and a variation in capacitance of at least one selected from the first cross electrode and the second cross electrode.

In some example embodiments, the sensor control circuit may include: a signal generation circuit that provides the sensor layer with the signal; a touch detection circuit that obtains a touch coordinate based on the detection signal provided from the sensor layer; and an input-device detection circuit that obtains an input-device coordinate based on the detection signal provided from the sensor layer.

In some example embodiments, the signal generation circuit may simultaneously (or concurrently) provide the same signal to the first electrode and the second electrode. The touch detection circuit may obtain the touch coordinate by merging a first detection signal received from the first cross electrode with a second detection signal received from the second cross electrode.

In some example embodiments, the input-device detection circuit may obtain the input-device coordinate based on a first detection signal received from the first electrode, a second detection signal received from the second electrode, a third detection signal received from the first cross electrode, and a fourth detection signal received from the second cross electrode.

In some example embodiments, the first electrode may include a first opening and a second opening that is spaced apart in the first direction from the first opening. The second electrode may include a first sensing pattern in the first opening, a second sensing pattern in the second opening, and a bridge pattern electrically connected to the first sensing pattern and the second sensing pattern.

In some example embodiments, the first sensing pattern and the second sensing pattern may be located on a layer the same as a layer on which the first electrode is located. Each of the first sensing pattern and the second sensing pattern may be surrounded by the first electrode.

In some example embodiments, the signal generation circuit may provide the first electrode with the signal. The touch detection circuit may obtain the touch coordinate based on a detection signal received from the first cross electrode. The input-device detection circuit may obtain the input-device coordinate based on a first detection signal received from the second electrode and a second detection signal received from the first cross electrode.

In some example embodiments, when the touch detection circuit operates, the second electrode may be electrically floated or grounded.

In some example embodiments, when the input-device detection circuit operates, the first electrode may be electrically floated or grounded.

In some example embodiments, a plurality of openings may be defined in each of the first cross electrode and the second cross electrode. A dummy pattern may be arranged in each of the plurality of openings, and the dummy pattern may be electrically floated.

In some example embodiments, the first cross electrode may include a first cross opening and a second cross opening that is spaced apart in the second direction from the first cross opening. The second cross electrode may include a first cross sensing pattern in the first cross opening, a second cross sensing pattern in the second cross opening, and a cross bridge pattern electrically connected to the first cross sensing pattern and the second cross sensing pattern.

In some example embodiments, the signal generation circuit may provide the first electrode with the signal. The touch detection circuit may obtain the touch coordinate based on a detection signal received from the first cross electrode. The input-device detection circuit may obtain the input-device coordinate based on a first detection signal received from the second electrode and a second detection signal received from the second cross electrode.

In some example embodiments, when the touch detection circuit operates, each of the second electrode and the second cross electrode may be electrically floated or grounded. When the input-device detection circuit operates, each of the first electrode and the first cross electrode may be electrically floated or grounded.

In some example embodiments, the first cross electrode may include a first cross opening and a second cross opening that is spaced apart in the second direction from the first cross opening. The second cross electrode may include a first cross sensing pattern in the first cross opening, a second cross sensing pattern in the second cross opening, and a cross bridge pattern electrically connected to the first cross sensing pattern and the second cross sensing pattern.

In some example embodiments, the signal generation circuit may provide the first electrode with the signal. The touch detection circuit may obtain the touch coordinate based on a detection signal received from the first cross electrode. The input-device detection circuit may obtain the input-device coordinate based on a first detection signal received from the first electrode and a second detection signal received from the second cross electrode.

In some example embodiments, when the touch detection circuit operates, the second cross electrode may be electrically floated or grounded. When the input-device detection circuit operates, the first cross electrode may be electrically floated or grounded.

In some example embodiments, the first electrode and the second electrode may be symmetrical with each other about a first reference line that extends along the first direction. The first cross electrode and the second cross electrode may be symmetrical with each other about a second reference line that extends along the second direction.

In some example embodiments, when viewed in a thickness direction of the sensor layer, the second electrode may be surrounded by the first electrode, and the second cross electrode may be surrounded by the first cross electrode.

According to some example embodiments of the present disclosure, an electronic device may include: a display layer; a sensor layer on the display layer, the sensor layer including a first electrode that extends along a first direction, a second electrode that extends along the first direction, a first cross electrode that extends along a second direction intersecting the first direction, and a second cross electrode that extends along the second direction; and a sensor control circuit including a signal generation circuit that provides the sensor layer with a signal, a touch detection circuit that obtains a touch coordinate based on a touch detection signal provided from the sensor layer, and an input-device detection circuit that obtains an input-device coordinate based on a pen detection signal provided from the sensor layer. The touch detection circuit may obtain the touch coordinate by receiving a detection signal received from at least one selected from the first cross electrode and the second cross electrode. The input-device detection circuit may obtain the input-device coordinate based on a detection signal received from at least one selected from the first electrode and the second electrode and a detection signal received from at least one selected from the first cross electrode and the second cross electrode.

In some example embodiments, the signal generation circuit may simultaneously (or concurrently) provide the same signal to the first electrode and the second electrode. The touch detection circuit may obtain the touch coordinate by merging the detection signal received from the first cross electrode with the detection signal received from the second cross electrode. The input-device detection circuit may obtain the input-device coordinate based on the detection signal received from each of the first electrode, the second electrode, the first cross electrode, and the second cross electrode.

In some example embodiments, the signal generation circuit may provide the first electrode with the signal. The touch detection circuit may obtain the touch coordinate based on the detection signal received from the first cross electrode. The input-device detection circuit may obtain the input-device coordinate based on the detection signal received from each of the second electrode and the second cross electrode. When the touch detection circuit receives the detection signal from the first cross electrode, the second electrode and the second cross electrode may be electrically floated or grounded. When the input-device detection circuit receives the detection signal from each of the second electrode and the second cross electrode, the first electrode and the first cross electrode may be electrically floated or grounded.

In some example embodiments, the signal generation circuits may sequentially provide the signal to the first electrode and the second electrode. The touch detection circuit may obtain the touch coordinate by receiving the detection signal from the first cross electrode. The input-device detection circuit may obtain the input-device coordinate based on the detection signal received from each of the first electrode, the second electrode, and the second cross electrode. When the touch detection circuit receives the detection signal from the first cross electrode, the second cross electrode may be electrically floated or grounded. When the input-device detection circuit receives the detection signal from each of the first electrode, the second electrode, and the second cross electrode, the first cross electrode may be electrically floated or grounded. The second electrode may be spaced apart in the second direction from the first electrode. The second cross electrode may be surrounded by the first cross electrode.

In some example embodiments, the signal generation circuit may provide the first electrode with the signal. The touch detection circuit may obtain the touch coordinate by receiving the detection signal received from each of the first cross electrode and the second cross electrode. The input-device detection circuit may obtain the input-device coordinate based on the detection signal received from each of the second electrode, the first cross electrode, and the second cross electrode. When the touch detection circuit receives the detection signal from each of the first cross electrode and the second cross electrode, the second electrode may be electrically floated or grounded. When the input-device detection circuit receives the detection signal from each of the second electrode, the first cross electrode, and the second cross electrode, the first electrode may be electrically floated or grounded. The second cross electrode may be spaced apart in the first direction from the first cross electrode. The second electrode may be surrounded by the first electrode.

DETAILED DESCRIPTION

Figure 1:
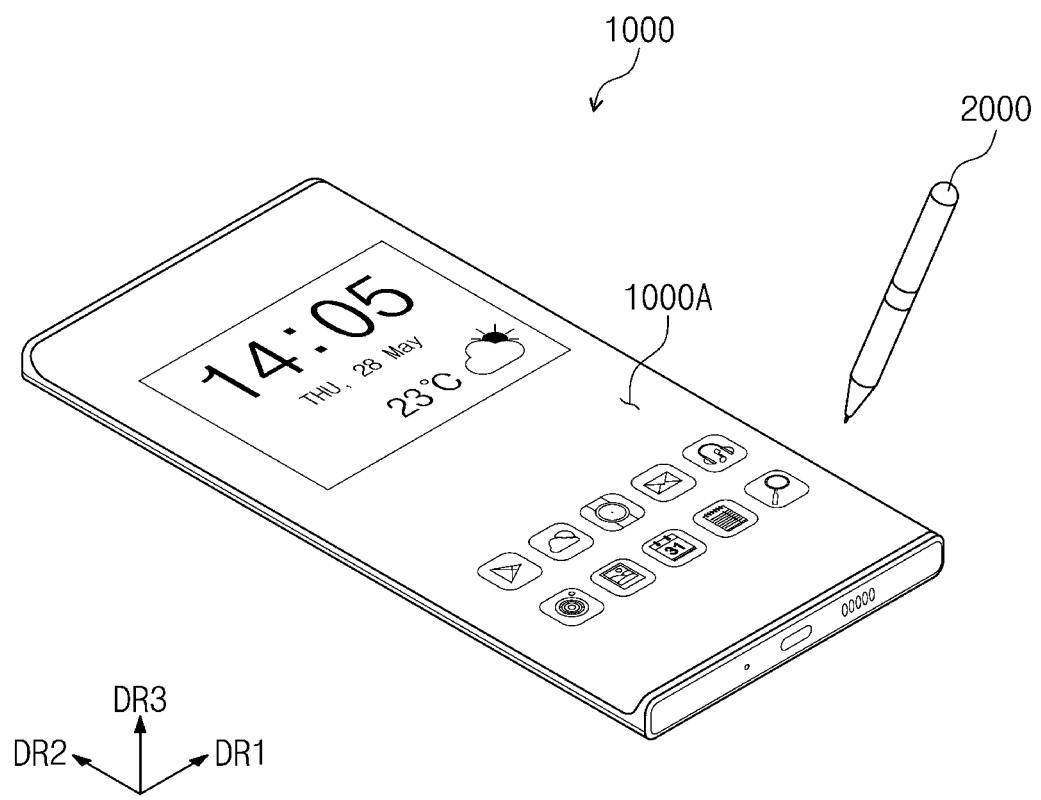
FIG. 1 is a perspective view showing aspects of an electronic device according to some example embodiments of the present disclosure.

In this description, when a certain component (or region, layer, portion, etc.) is referred to as being "on", "connected to", or "coupled to" other component(s), the certain component may be directly located on, directly connected to, or directly coupled to the other component(s) or at least one intervening component may be present therebetween.

Like numerals indicate like components. Moreover, in the drawings, thicknesses, ratios, and dimensions of components are exaggerated for effectively explaining the technical contents.

The term "and/or" includes one or more combinations defined by associated components.

It will be understood that, although the terms first, second, etc. may be used herein to describe various components, these components should not be limited by these terms. These terms are only used to distinguish one component from another component. For example, a first component could be termed a second component, and vice versa without departing from the scope of the present inventive concept.

Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

Unless otherwise defined, all terms used herein including technical and scientific terms have the same meaning generally understood by one of ordinary skilled in the art. Also, terms as defined in dictionaries generally used should be understood as having meaning identical or meaning contextually defined in the art and should not be understood as ideally or excessively formal meaning unless definitely defined herein.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe aspects of some example embodiments of the present disclosure in conjunction with the accompanying drawings.

FIG. 1 is a perspective view showing aspects of an electronic device according to some example embodiments of the present disclosure.

Referring to FIG. 1, an electronic device 1000 may be an apparatus that is activated with an electronic signal. For example, the electronic device 1000 may be a mobile phone, a tablet computer, an automotive navigation system, a game console, or a wearable apparatus, but embodiments according to the present disclosure are not limited thereto. FIG. 1 depicts a mobile phone as an example of the electronic device 1000.

The electronic device 1000 may display images on an active region 1000A. The active region 1000A may include a plane defined by a first direction DR1 and a second direction DR2. A thickness direction of the electronic device 1000 may be parallel to a third direction DR3 that intersects the first direction DR1 and the second direction DR2. The third direction DR3 may be used as a reference to define front and rear surfaces (or top and bottom surfaces) of each of members that constitute the electronic device 1000.

The electronic device 1000 may detect inputs that are externally applied from outside the electronic device 1000. The external input may be a user's input. The external input may include a user's body part (referred to hereinafter as touch), an input device 2000, light, heat, pressure, or any various type inputs.

The electronic device 1000 shown in FIG. 1 may detect inputs from either a user's touch (see 3000 of FIG. 4) or the input device 2000. The input device 2000 may indicate an apparatus other than a user's body. For example, the input device 2000 may be an active pen, a stylus pen, a touch pen, or an electronic pen. The following will describe an example in which an active pen is adopted as the input device 2000.

The electronic device 1000 and the input device 2000 may perform two-way communication. The electronic device 1000 may provide the input device 2000 with uplink signals. For example, the uplink signals may include synchronization signals or information about the electronic device 1000, but embodiments according to the present disclosure are not particularly limited thereto. The input device 2000 may provide the electronic device 1000 with downlink signals.

The downlink signals may include synchronization signals or information about states of the input device 2000. For example, the downlink signals may include coordinate information of the input device 2000, battery information of the input device 2000, slope information of the input device 2000, and/or various information stored in the input device 2000, but embodiments according to the present disclosure are not particularly limited thereto.

Figure 2A:
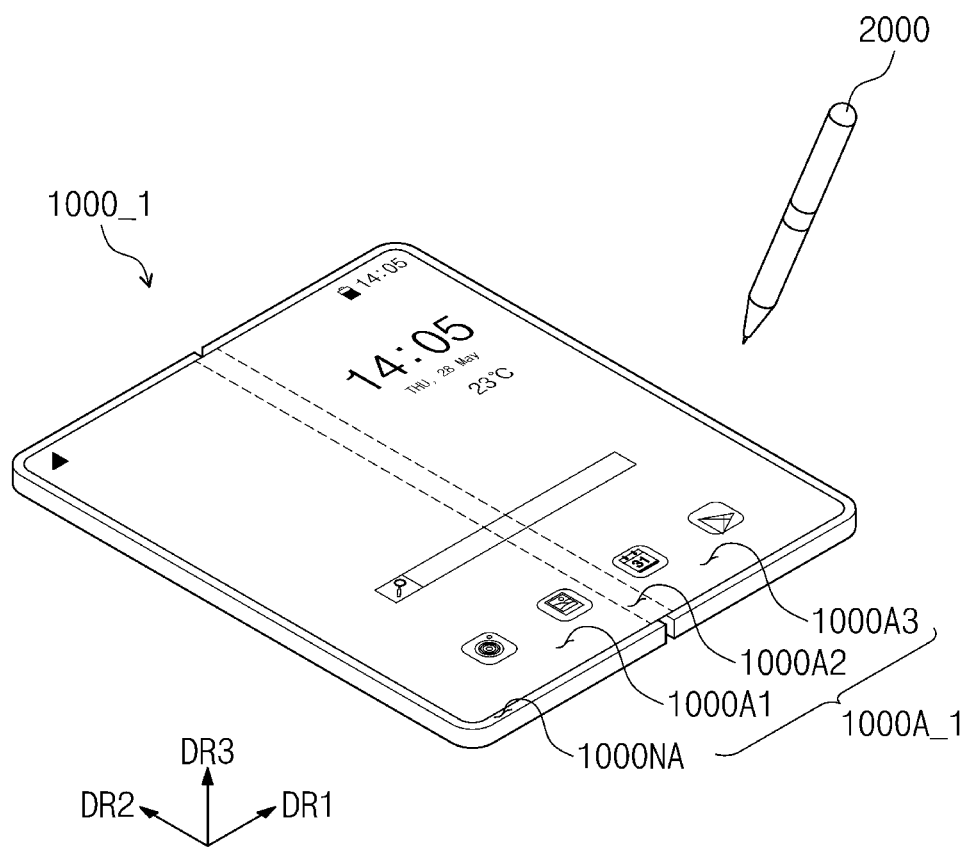
FIGS. 2A and 2B is a perspective views showing aspects of an electronic device according to some example embodiments of the present disclosure.
Figure 2B:
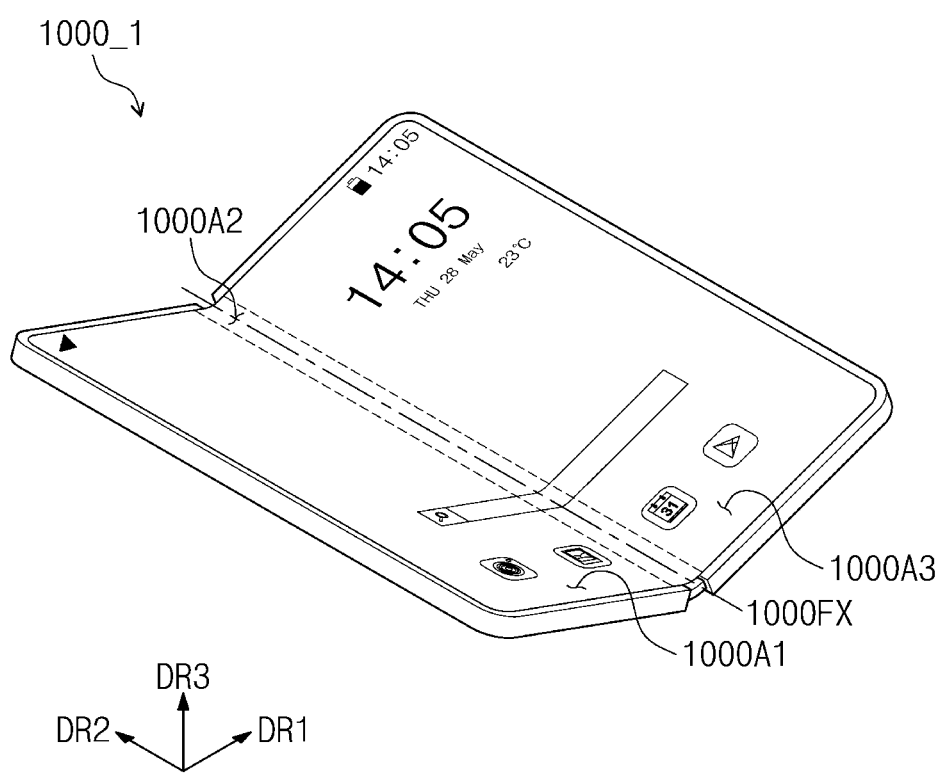

FIGS. 2A and 2B illustrate perspective views showing an electronic device according to some example embodiments of the present disclosure.

Referring to FIGS. 2A and 2B, an electronic device 1000_1 may display images in an active region 1000A_1. When the electronic device 1000_1 is in an unfolded state, the active region 1000A_1 may include a plane defined by the first direction DR1 and the second direction DR2.

The active region 1000A_1 may include a first region 1000A1, a second region 1000A2, and a third region 1000A3. The second region 1000A2 may bend about a folding axis 1000FX that extends along the second direction DR2. Therefore, the first region 1000A1 and the third region 1000A3 may each be called a non-folding region, and the second region 1000A2 may be called a folding region.

When the electronic device 1000_1 is folded, the first region 1000A1 and the third region 1000A3 may face each other. Therefore, in a fully folded state, the active region 1000A_1 may not be externally exposed, which may be called an in-folding operation or in-folding position. This, however, is merely an example, and the operation of the electronic device 1000_1 is not limited to that discussed above.

For example, in some example embodiments of the present disclosure, when the electronic device 1000_1 is folded, the first region 1000A1 and the third region 1000A3 may stand opposite to (or face away from) each other. Therefore, in a folded state, the active region 1000A_1 may be externally exposed, which may be called an out-folding operation or out-folding position.

The electronic device 1000_1 may be configured to perform only one of the in-folding and out-folding operations. Alternatively, the electronic device 1000_1 may be configured to perform both of the in-folding and out-folding operations. In this case, the electronic device 1000_1 may allow its region (e.g., the second region 1000A2) to perform both of the in-folding and out-folding operations.

FIGS. 2A and 2B depict by way of example one folding region and two non-folding regions, but no limitation is imposed on the number of the folding regions and of the non-folding regions. For example, the electronic device 1000_1 may include more than two non-folding regions and a plurality of folding regions each of which is located between neighboring non-folding regions.

FIGS. 2A and 2B show an example of the folding axis 1000FX extending in the second direction DR2, but embodiments according to the present disclosure are not limited thereto. For example, the folding axis 1000FX may extend along a direction parallel to the first direction DR1. In this case, the first region 1000A1, the second region 1000A2, and the third region 1000A3 may be sequentially arranged along the second direction DR2.

The active region 1000A_1 may overlap one or more electronic modules. For example, the electronic modules may include a camera module and a proximity luminance sensor. The electronic modules may receive external inputs through the active region 1000A_1 or may provide outputs through the active region 1000A_1. The active region 1000A_1 may have a greater transmittance at its portion that overlaps the camera module and the proximity luminance sensor than at its other region. Therefore, it may not be required that a peripheral region 1000NA around the active region 1000A_1 be provided with a section where a plurality of electronic modules will be placed. As a result, an area ratio of the active region 1000A_1 may be increased compared to a front surface of the electronic device 1000_1.

The electronic device 1000_1 and the input device 2000 may perform two-way communication. The electronic device 1000_1 may provide the input device 2000 with uplink signals. The input device 2000 may provide the electronic device 1000_1 with downlink signals. The electronic device 1000_1 may detect coordinates of the input device 2000 by using signals provided from the input device 2000.

Figure 3A:
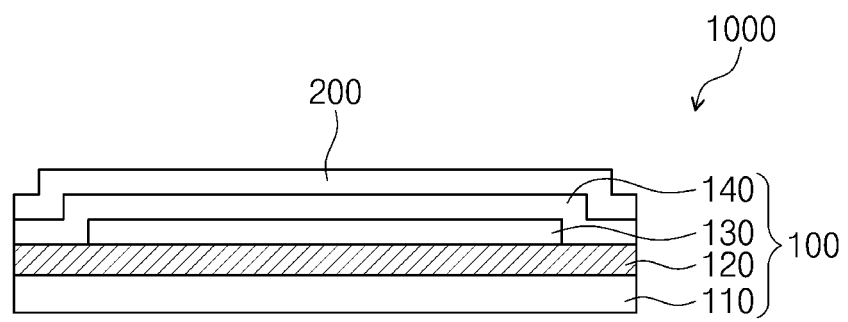
FIG. 3A is a cross-sectional view showing aspects of an electronic device according to some example embodiments of the present disclosure.

FIG. 3A illustrates a simplified cross-sectional view showing an electronic device according to some example embodiments of the present disclosure.

Referring to FIG. 3A, the electronic device 1000 may include a display layer 100 and a sensor layer 200.

The display layer 100 may be a component that substantially generates images. The display layer 100 may be an emissive display layer, for example, an organic light emitting display layer, a quantum-dot display layer, a micro-led display layer, or a nano-led display layer.

The display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, or a polymer substrate. Some example embodiments, however, are not limited thereto, and the base layer 110 may be an inorganic layer, an organic layer, or a composite material layer.

The base layer 110 may have a multi-layered structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be called a base barrier layer.

Each of the first and second synthetic resin layers may include a polyimide-based resin. Additionally, or alternatively, each of the first and second synthetic resin layers may include at least one selected from an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. In this description, the language "X-based resin" may mean a resin including a functional group of X.

The circuit layer 120 may be located on the base layer 110. The circuit layer 120 may include an insulating layer, a semiconductor pattern, a conductive pattern, a signal line, and the like. Coating and deposition processes may be employed such that a insulating layer, a semiconductor layer, and a conductive layer are formed on the base layer 110, and then a photolithography process may be performed several times to selectively pattern the insulating layer, the semiconductor layer, and the conductive layer. Afterwards, there may be formed the semiconductor pattern, the conductive pattern, and the signal line included in the circuit layer 120.

The light emitting element layer 130 may be located on the circuit layer 120. The light emitting element layer 130 may include a light emitting element. For example, the light emitting element layer 130 may include an organic light emitting material, a quantum dot, a quantum rod, a microled, or a nano-led.

The encapsulation layer 140 may be located on the light emitting element layer 130. The encapsulation layer 140 may include an inorganic layer, an organic layer, and an inorganic layer that are sequentially stacked, but no limitation is imposed on the constituent layers of the encapsulation layer 140.

The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acryl-based organic layer, but embodiments according to the present disclosure are not limited thereto.

The sensor layer 200 may be located on the display layer 100. The sensor layer 200 may detect external inputs that are externally applied. A successive process may be employed to form the sensor layer 200 on the display layer 100. In this case, it may be expressed that the sensor layer 200 is directly located on the display layer 100. The phrase "directly located on" may mean that no third component is located between the sensor layer 200 and the display layer 100. For example, no adhesive member may be separately located between the sensor layer 200 and the display layer 100.

Alternatively, the sensor layer 200 may be coupled through an adhesive member to the display layer 100. The adhesive member may include an ordinary adhesive or glue.

Figure 3B:
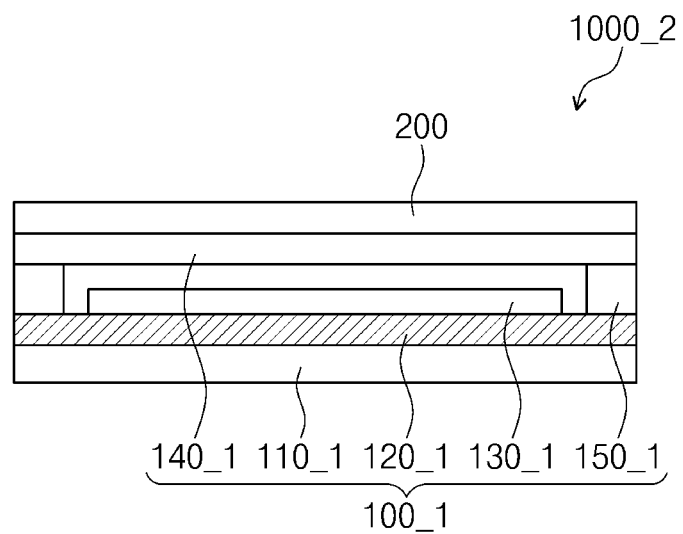
FIG. 3B is a cross-sectional view showing aspects of an electronic device according to some example embodiments of the present disclosure.

FIG. 3B illustrates a simplified cross-sectional view showing an electronic device according to some example embodiments of the present disclosure.

Referring to FIG. 3B, an electronic device 1000_2 may include a display layer 100_1 and a sensor layer 200.

The display layer 100_1 may include a first base layer 110_1, a circuit layer 120_1, a light emitting element layer 130_1, a second base layer 140_1, and a coupling member 150_1. The first base layer 110_1 and the second base layer 140_1 may each be a glass substrate, a metal substrate, or a polymer substrate. Embodiments according to the present disclosure, however, are not limited thereto. The circuit layer 120_1 and the light emitting element layer 130_1 may respectively correspond to the circuit layer 120 and the light emitting element layer 130 that are discussed in FIG. 3A, and thus some detailed explanation thereof may be omitted.

The coupling member 150_1 may be located between the first base layer 110_1 and the second base layer 140_1. The coupling member 150_1 may include an organic material or an inorganic material. For example, the organic material may include a photo-curable resin or a photo-plastic resin, and the inorganic material may include a frit seal. However, the material of the coupling member 150_1 is not limited to the example discussed above.

The sensor layer 200 may be formed on the second base layer 140_1. In this case, no third component may be located between the sensor layer 200 and the second base layer 140_1. For example, no adhesive member may be separately located between the sensor layer 200 and the second base layer 140_1. For another example, the sensor layer 200 may be coupled through an adhesive member to the second base layer 140_1.

Figure 4:
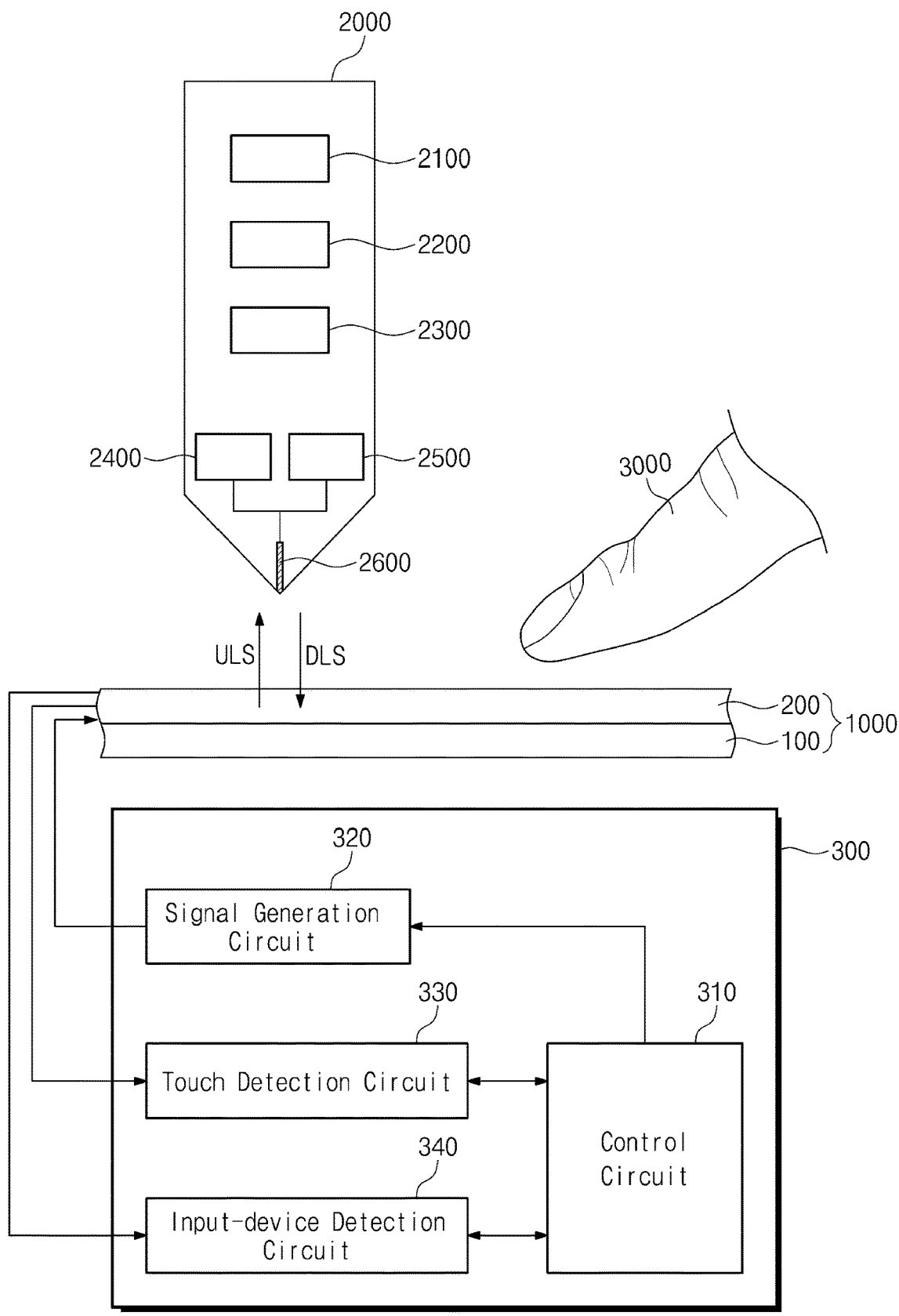
FIG. 4 is a block diagram showing some components of an input device and an electronic device according to some example embodiments of the present disclosure.

FIG. 4 illustrates a simplified block diagram showing an input device and an electronic device according to some example embodiments of the present disclosure.

Referring to FIG. 4, the electronic device 1000 may include a display layer 100, a sensor layer 200, and a sensor control circuit 300.

The sensor layer 200 may operate in time-division driving. For example, the sensor layer 200 may be alternately and repeatedly driven under a first mode and a second mode. An input from the touch 3000 may be detected under the first mode, and an input from the input device 2000 may be detected under the second mode. Under the first mode, the touch 3000 may be detected based on a variation in mutual capacitance, and under the second mode, an input from the input device 2000 may be detected based on a variation in capacitance.

The sensor control circuit 300 may provide signals to the sensor layer 200 or may receive detection signals from the sensor layer 200. The sensor control circuit 300 may include a control circuit 310, a signal generation circuit 320, a touch detection circuit 330, and an input-device detection circuit 340.

The control circuit 310, the signal generation circuit 320, the touch detection circuit 330, and the input-device detection circuit 340 may be named after their operation. Therefore, all of the control circuit 310, the signal generation circuit 320, the touch detection circuit 330, and the input-device detection circuit 340 may be implemented in a single chip, or one or more of the circuits 310, 320, 330, and 340 may be implemented in a different chip from that in which others of the circuits 310, 320, 330, and 340 are implemented.

The control circuit 310 may control operations of the signal generation circuit 320, the touch detection circuit 330, and the input-device detection circuit 340. The signal generation circuit 320 may provide the sensor layer 200 with signals. Under the first mode, the touch detection circuit 330 may receive detection signals from the sensor layer 200. Under the second mode, the input-device detection circuit 340 may receive detection signals from the sensor layer 200.

When the second mode begins, the sensor layer 200 may provide the input device 2000 with an uplink signal ULS. When the input device 2000 receives the uplink signal ULS and is synchronized with the electronic device 1000, the input device 2000 may provide the sensor layer 200 with a downlink signal DLS.

The input device 2000 may include a power source 2100, a memory 2200, a controller 2300, a transmitter 2400, a receiver 2500, and a pen tip 2600. The components of the input device 2000, however, are not limited to those mentioned above. For example, the input device 2000 may further include an electrode switch that switches the pen tip 2600 into a signal transmission mode or a signal reception mode, a pressure sensor that detects pressure, or a rotation senor that detects rotation.

The power source 2100 may include one of a battery and a high-capacitance capacitor each of which provides the input device 2000 with power. The memory 2200 may store information about functions of the input device 2000. The controller 2300 may control an operation of the input device 2000. Each of the transmitter 2400 and the receiver 2500 may communicate through the pen tip 2600 with the electronic device 1000. The transmitter 2400 may be called a signal generator or a transmission circuit, and the receiver 2500 may be called a signal receiver or a receiving circuit.

Figure 5:
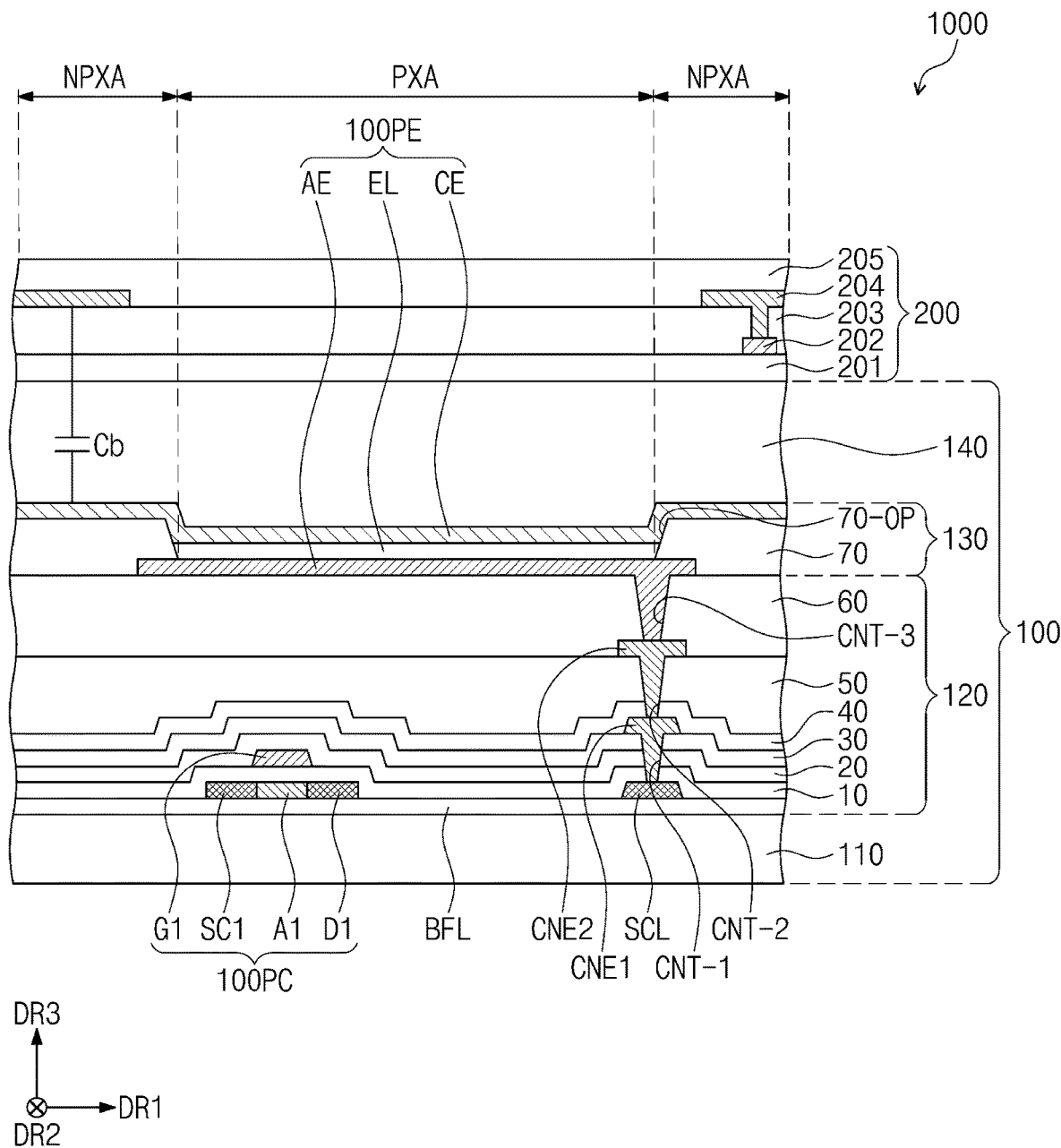
FIG. 5 is a cross-sectional view showing aspects of an electronic device according to some example embodiments of the present disclosure.

FIG. 5 illustrates a cross-sectional view showing an electronic device according to some example embodiments of the present disclosure.

Referring to FIG. 5, at least one inorganic layer may be formed on a top surface of the base layer 110. The inorganic layer may include at least one selected from aluminum oxide, titanium oxide, silicon oxide, silicon oxynitride, zirconium oxide, and hafnium oxide. The inorganic layer may be formed multi-layered. The multi-layered inorganic layers may constitute a barrier layer and/or a buffer layer. In some example embodiments, the display layer 100 is illustrated to include a buffer layer BFL.

The buffer layer BFL may increase a bonding force between the base layer 110 and a semiconductor pattern. The buffer layer BFL may include a silicon oxide layer and a silicon nitride layer, and the silicon oxide layer and the silicon nitride layer may be alternately stacked.

The semiconductor pattern may be located on the buffer layer BFL. The semiconductor pattern may include polysilicon. Embodiments according to the present disclosure, however, are not limited thereto, and the semiconductor pattern may include amorphous silicon or metal oxide.

FIG. 5 merely depicts a portion of the semiconductor pattern, and the semiconductor pattern may further be arranged at other regions. The semiconductor pattern may be specifically arranged over pixels. The semiconductor pattern may have different electrical characteristics based on whether being doped or not. The semiconductor pattern may include a first region whose conductivity is high and a second region whose conductivity is low. The first region may be doped with n-type or p-type impurities. A p-type transistor may include a doped region implanted with p-type impurities, and an n-type transistor may include a doped region implanted with n-type impurities. The second region may be an undoped region or may be a doped region implanted with impurities whose concentration is lower than that of impurities doped into the first region.

The first region may have conductivity greater than that of the second region, and may substantially serve as an electrode and a signal line. The second region may substantially correspond to an active (or channel) of a transistor. For example, a portion of the semiconductor pattern may be an active of a transistor, another portion of the semiconductor pattern may be a source or drain of the transistor, and still another portion of the semiconductor pattern may be a connection electrode or a connection signal line.

Each of the pixels may have an equivalent circuit including seven transistors, one capacitor, and a light emitting element, and the equivalent circuit of the pixel may be variously changed. FIG. 5 depicts by way of example a pixel including a transistor 100PC and one light emitting element 100PE.

A source SC1, an active A1, and a drain D1 of the transistor 100PC may be formed of the semiconductor pattern. When viewed in cross-section, the source SC1 and the drain D1 may extend in opposite directions from the active A1. FIG. 5 partially shows a connection signal line SCL formed of the semiconductor pattern. According to some example embodiments, when viewed in a plan view, the connection signal line SCL may be electrically connected to the drain D1 of the transistor 100PC.

A first insulating layer 10 may be located on the buffer layer BFL. The first insulating layer 10 may commonly overlap a plurality of pixels and may cover the semiconductor pattern. The first insulating layer 10 may be one or more of an inorganic layer and an organic layer, and may have a single-layered or multi-layered structure. The first insulating layer 10 may include at least one selected from aluminum oxide, titanium oxide, silicon oxide, silicon oxynitride, zirconium oxide, and hafnium oxide. In some example embodiments, the first insulating layer 10 may be a single-layered silicon oxide layer. Likewise, an insulating layer of the circuit layer 120 may be one or more of an inorganic layer and an organic layer, and may have a single-layered or multi-layered structure. The inorganic layer may include at least one of the materials mentioned above, but embodiments according to the present disclosure are not limited thereto.

The transistor 100PC may have a gate G1 located on the first insulating layer 10. The gate G1 may be a portion of a metal pattern. The gate G1 may overlap the active A1. The gate G1 may serve as a mask when the semiconductor pattern is doped.

A second insulating layer 20 may be located on the first insulating layer 10 and may cover the gate G1. The second insulating layer 20 may commonly overlap the pixels. The second insulating layer 20 may be one or more of an inorganic layer and an organic layer, and may have a single-layered or multi-layered structure. In some example embodiments, the second insulating layer 20 may be a single-layered silicon oxide layer.

A third insulating layer 30 may be located on the second insulating layer 20, and in some example embodiments, may be a single-layered silicon oxide layer A first connection electrode CNE1 may be located on the third insulating layer 30. The first connection electrode CNE1 may be coupled to a connection signal line through a contact hole CNT-1 that penetrates the first, second, and third insulating layers 10, 20, and 30.

A fourth insulating layer 40 may be located on the third insulating layer 30. The fourth insulating layer 40 may be a single-layered silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be coupled to the first connection electrode CNE1 through a contact hole CNT-2 that penetrates the fourth and fifth insulating layers 40 and 50.

A sixth insulating layer 60 may be located on the fifth insulating layer 50 and may cover the second connection electrode CNE2. The sixth insulating layer 60 may be an organic layer. The light emitting element layer 130 may be located on the circuit layer 120. The light emitting element layer 130 may include a light emitting element 100PE. For example, the light emitting element layer 130 may include an organic light emitting material, a quantum dot, a quantum rod, a micro-led, or a nano-led. The light emitting element 100PE may include a first electrode AE, an emission layer EL, and a second electrode CE (or a common electrode).

The first electrode AE may be located on the sixth insulating layer 60. The first electrode AE may be connected to the second connection electrode CNE2 through a contact hole CNT-3 that penetrates the sixth insulating layer 60.

A pixel definition layer 70 may be located on the sixth insulating layer 60 and may cover a portion of the first electrode AE. An opening 70-OP may be defined in the pixel definition layer 70. The opening 70-OP of the pixel definition layer 70 exposes at least a portion of the first electrode AE. In some example embodiment, a light emitting region PXA may be defined to correspond to the portion of the first electrode AE, which portion is exposed to the opening 70-OP. A non-light emitting region NPXA may surround the light emitting region PXA.

The emission layer EL may be located on the first electrode AE. The emission layer EL may be located in the opening 70-OP. For example, the emission layer EL may be formed on each of the pixels. When a plurality of emission layers EL are formed on corresponding pixels, the emission layers EL may each emit light having at least one selected from blue, red, and green colors. Embodiments according to the present disclosure, however, are not limited thereto, and the emission layer EL may be provided which is connected in common to the pixels. In this case, the emission layer EL may provide a blue light or a white light.

The second electrode CE may be located on the emission layer EL. The second electrode CE may be located in common on a plurality of pixels, while having a single unitary shape. The second electrode CE may be supplied with a common voltage and may be called a common electrode.

According to some example embodiments, a hole control layer may be located between the first electrode AE and the emission layer EL. The hole control layer may be located in common on the light emitting region PXA and the non-light emitting region NPXA. The hole control layer may include a hole transport layer, and may further include a hole injection layer. An electron control layer may be located between the emission layer EL and the second electrode CE. The electron control layer may include an electron transport layer and may further include an electron injection layer. An open mask may be used to form the hole control layer and the electron control layer that are commonly arranged on a plurality of pixels. The encapsulation layer 140 may be located on the light emitting element layer 130. The encapsulation layer 140 may include an inorganic layer, an organic layer, and an inorganic layer that are sequentially stacked, but no limitation is imposed on the constituent layers of the encapsulation layer 140.

The inorganic layers may protect the light emitting element layer 130 against moisture and oxygen, and the organic layer may protect the light emitting element layer 130 against foreign substances such as dust particles. The inorganic layers may include a silicon nitride layer, a silicon oxynitride layer, a silicon oxide layer, a titanium oxide layer, or an aluminum oxide layer. The organic layer may include an acryl-based organic layer, but embodiments according to the present disclosure are not limited thereto.

A successive process may be employed to form the sensor layer 200 on the display layer 100. In this case, it may be expressed that the sensor layer 200 is directly located on the display layer 100. The phrase "directly located on" may mean that no third component is located between the sensor layer 200 and the display layer 100. For example, no adhesive member may be separately arranged between the sensor layer 200 and the display layer 100. In this case, the electronic device 1000 may decrease in thickness. In addition, a reduction in thickness of the display layer 100 and the sensor layer 200 may increase flexibility, the sensor layer 200 may be applicable to the foldable electronic device 1000_1 of FIG. 2A.

The sensor layer 200 may include a base layer 201, a first conductive layer 202, a sensing insulating layer 203, a second conductive layer 204, and a cover insulating layer 205.

The base layer 201 may be an inorganic layer that includes one of silicon nitride, silicon oxynitride, and silicon oxide. Alternatively, the base layer 201 may be an organic layer that includes an epoxy-based resin, an acryl-based resin, or an imide-based resin. The base layer 201 may have a single-layered structure and a multi-layered structure stacked along the third direction DR3.

Each of the first and second conductive layers 202 and 204 may have a single-layered structure or a multi-layered structure stacked along the third direction DR3.

The single-layered conductive layer may include a metal layer or a transparent conductive layer. The metal layer may include molybdenum, silver, titanium, copper, aluminum, or an alloy thereof. The transparent conductive layer may include transparent conductive oxide, such as indium tin oxide (ITO), indium zinc oxide (IZO), zinc oxide (ZnO), or indium zinc tin oxide (IZTO). Additionally, or alternatively, the transparent conductive layer may include a metal nanowire, a graphene, or a conductive polymer such as PEDOT.

The multi-layered conductive layer may include metal layers. The metal layers may include, for example, trilayered structure of titanium/aluminum/titanium. The multilayered conductive layer may include at least one metal layer and at least one transparent conductive layer.

One or both of the sensing insulating layer 203 and the cover insulating layer 205 may include an inorganic layer. The inorganic layer may include at least one selected from aluminum oxide, titanium oxide, silicon oxide, silicon oxynitride, zirconium oxide, and hafnium oxide.

One or both of the sensing insulating layer 203 and the cover insulating layer 205 may include an organic layer. The organic layer may include one or more of an acryl-based resin, methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin. When the sensing insulating layer 203 and the cover insulating layer 205 include an organic layer, the sensor layer 200 may increase in flexibility. Therefore, an organic layer may be included in all of the sensing insulating layer 203 and the cover insulating layer 205 of the sensor layer 200 that is applied to the electronic device 1000_1 of FIG. 2A. Embodiments according to the present disclosure, however, are not particularly limited thereto.

A parasitic capacitance Cb may arise between the sensor layer 200 and the second electrode CE. The parasitic capacitance Cb may be called a base capacitance. A reduction in distance between the sensor layer 200 and the second electrode CE may induce an increase in parasitic capacitance Cb. The increase in parasitic capacitance Cb may reduce a ratio of variation in capacitance with respect to a reference value. The variation in capacitance may indicate a change in capacitance or mutual capacitance that occurs between before and after an input from an input means, for example, the input device (see 2000 of FIG. 4) or the touch (see 3000 of FIG. 4).

The sensor control circuit (see 300 of FIG. 4) that processes signals detected from the sensor layer 200 may perform a leveling operation in which a value corresponding to the parasitic capacitance Cb is removed from the detected signal. The leveling operation may increase the ratio of variation in capacitance with respect to the reference value, and detection sensitivity may thus be improved.

However, the capability of removing the value corresponding to the parasitic capacitance Cb may depend on a specification of the sensor control circuit 300. For example, when about 500 pF is assigned to a maximum value of the parasitic capacitance Cb, and when about 200 pF is given to a value of the parasitic capacitance Cb that the sensor control circuit 300 can remove from a signal detected from the sensor layer 200, the reference value may not be sufficiently reduced. In this case, the ratio of variation in capacitance may be insignificant compared to the reference value, and thus the sensor control circuit 300 may not detect the variation in capacitance caused by an input from the input device 2000 or the touch 3000, or may consider the variation in capacitance as noise, which may result in malfunction that fails to detect a touch coordinate.

According to some example embodiments of the present disclosure, an electrode structure of the sensor layer 200 may be changed such that the maximum value of the parasitic capacitance Cb may be reduced below a certain value. In this case, it may be possible to increase accuracy of coordinate detection even when the sensor control circuit 300 has relatively poor performance. The certain value may be about 200 pF, but embodiments according to the present disclosure are not particularly limited thereto.

Figure 6:
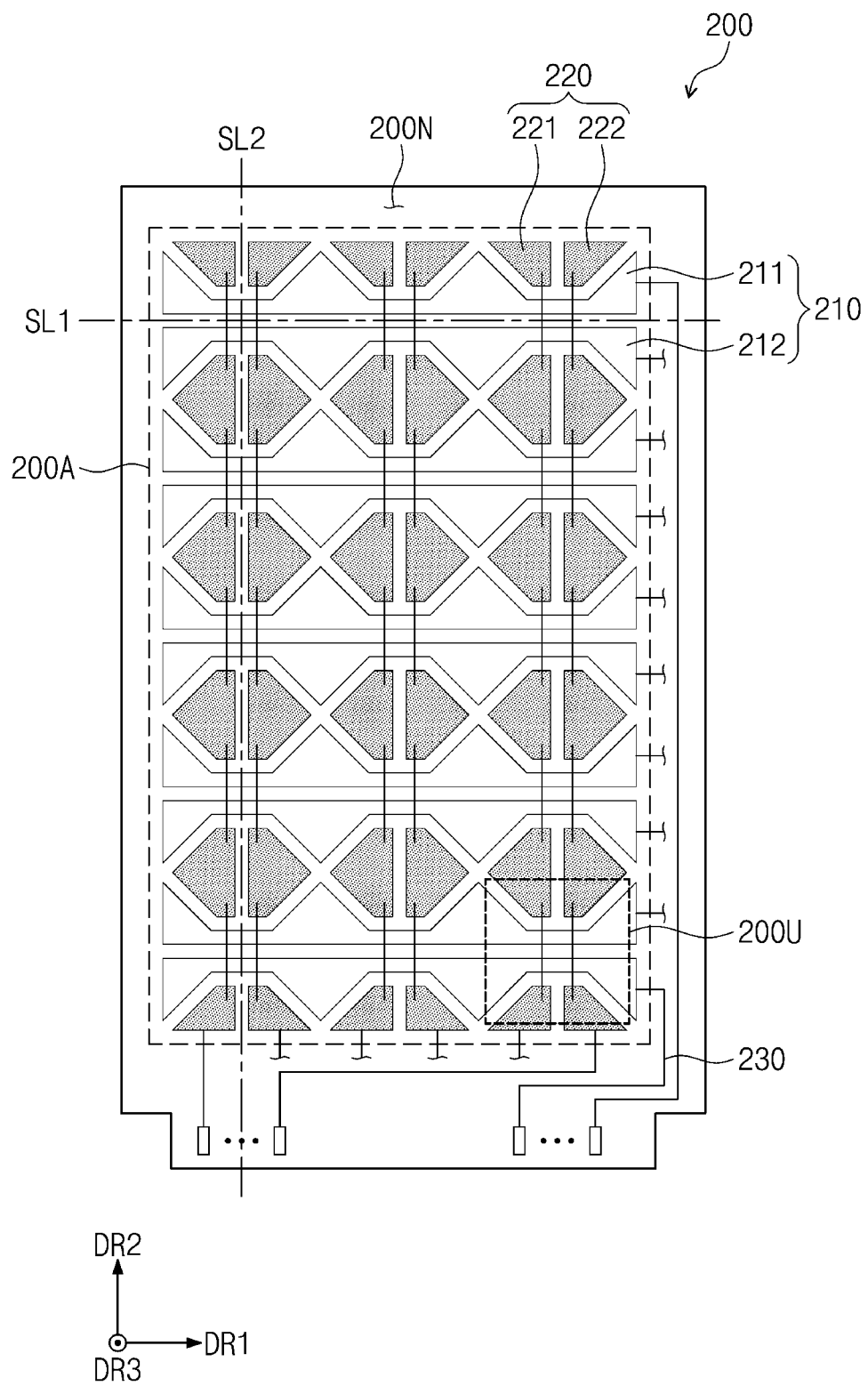
FIG. 6 is a plan view showing aspects of a sensor layer according to some example embodiments of the present disclosure.

FIG. 6 illustrates a plan view showing a sensor layer according to some example embodiments of the present disclosure.

Referring to FIG. 6, the sensor layer 200 may include a detection region 200A and a peripheral region 200N. The detection region 200A may be an area that is activated with an electrical signal. For example, the detection region 200A may be an input detection section. The peripheral region 200N may surround the detection region 200A.

The sensor layer 200 may include a plurality of first sensing electrodes 210, a plurality of second sensing electrodes 220, and a plurality of sensing lines 230. The first sensing electrodes 210 and the second sensing electrodes 220 may be located on the detection region 200A. The sensing lines 230 may be located on the peripheral region 200N.

The sensor layer 200 may operate either under the first mode in which inputs from the touch (see 3000 of FIG. 4) are detected based on a variation in mutual capacitance between the first sensing electrodes 210 and the second sensing electrodes 220, or under the second mode in which inputs from the input device (see 2000 of FIG. 4) are detected based on a variation in capacitance of each of the first and second sensing electrodes 210 and 220.

Each of the first sensing electrodes 210 may extend in the first direction DR1. The first sensing electrodes 210 may be arranged spaced apart from each other in the second direction DR2. Each of the second sensing electrodes 220 may extend in the second direction DR2. The second sensing electrodes 220 may be arranged spaced apart from each other in the first direction DR1. The first sensing electrodes 210 may intersect the second sensing electrodes 220.

Each of the first sensing electrodes 210 may include a first electrode 211 and a second electrode 212. Each of the second sensing electrodes 220 may include a first cross electrode 221 and a second cross electrode 222. The sensing lines 230 may be connected to the first electrode 211, the second electrode 212, the first cross electrode 221, and the second cross electrode 222.

A single sensing unit 200U may include the first electrode 211, the second electrode 212, the first cross electrode 221, and the second cross electrode 222 that are electrically connected to different sensing lines 230 electrically separated from each other in the sensor layer 200, and thus the first electrode 211, the second electrode 212, the first cross electrode 221, and the second cross electrode 222 may be electrically separated from each other.

A maximum parasitic capacitance may arise between the second electrode (see CE of FIG. 5) and its facing counter electrode of the sensor layer 200. The counter electrode may be a conductive pattern whose area is greater than any other component included in the sensor layer 200. For example, the counter electrode may be one first electrode 211 and one sensing line 230 electrically connected to the one first electrode 211, or one first cross electrode 221 and one sensing line 230 electrically connected to the one first cross electrode 221. The first electrode 211 and the second electrode 212 may be electrically separated from each other in the sensor layer 200, and the first cross electrode 221 and the second cross electrode 222 may be electrically separated from each other in the sensor layer 200. Therefore, the sensor layer 200 may have a reduced maximum parasitic capacitance.

Each of the first and second electrodes 211 and 212 may extend along the first direction DR1, and each of the first and second cross electrodes 221 and 222 may extend along the second direction DR2. The first electrode 211 and the second electrode 212 may be symmetrical with each other about a first reference line SL1 that extends along the first direction DR1. The first cross electrode 221 and the second cross electrode 222 may be symmetrical with each other about a second reference line SL2 that extends along the second direction DR2.

Figure 7A:
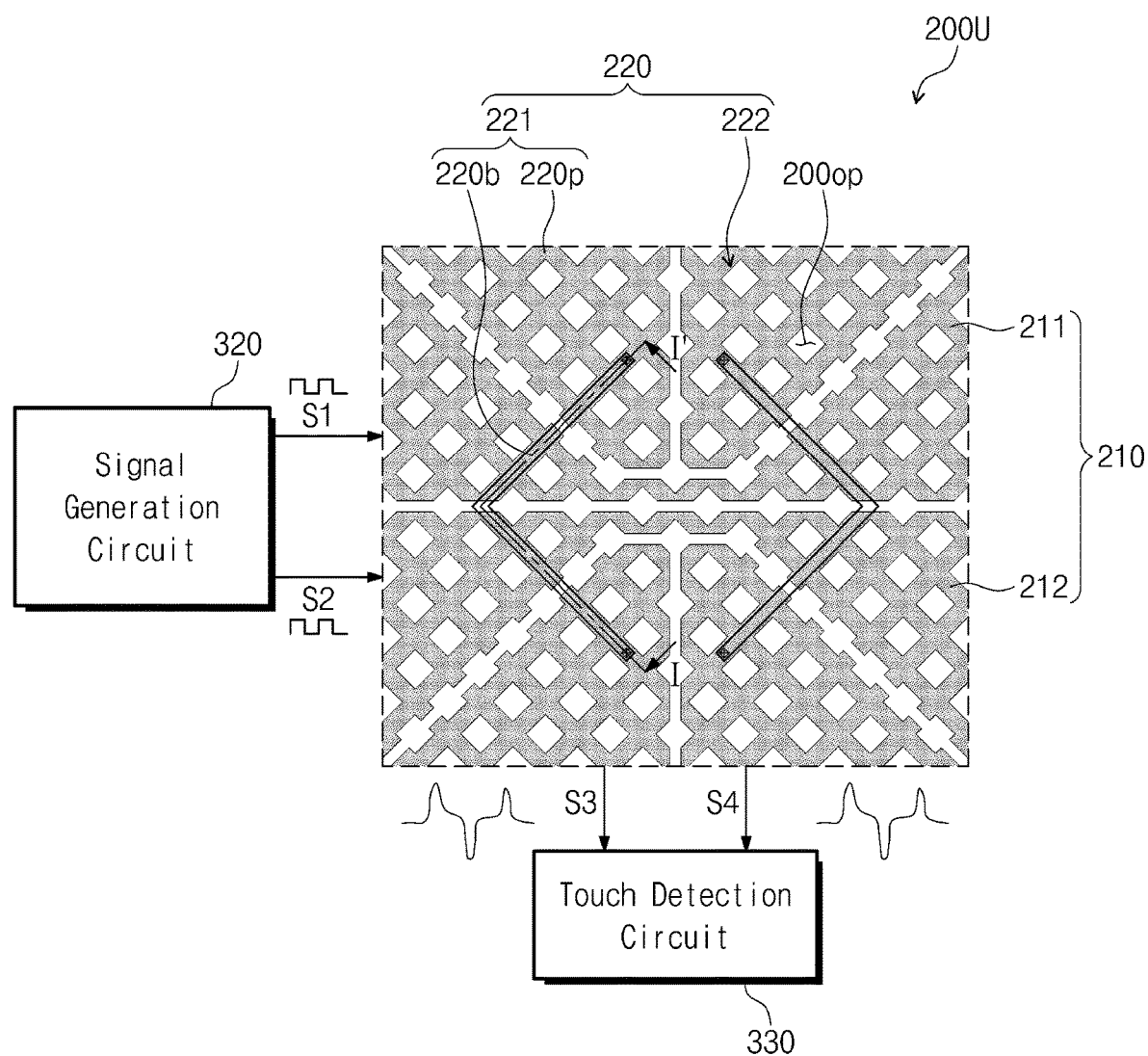
FIG. 7A is a schematic diagram showing how a sensor layer detects a touch input according to some example embodiments of the present disclosure.
Figure 7B:
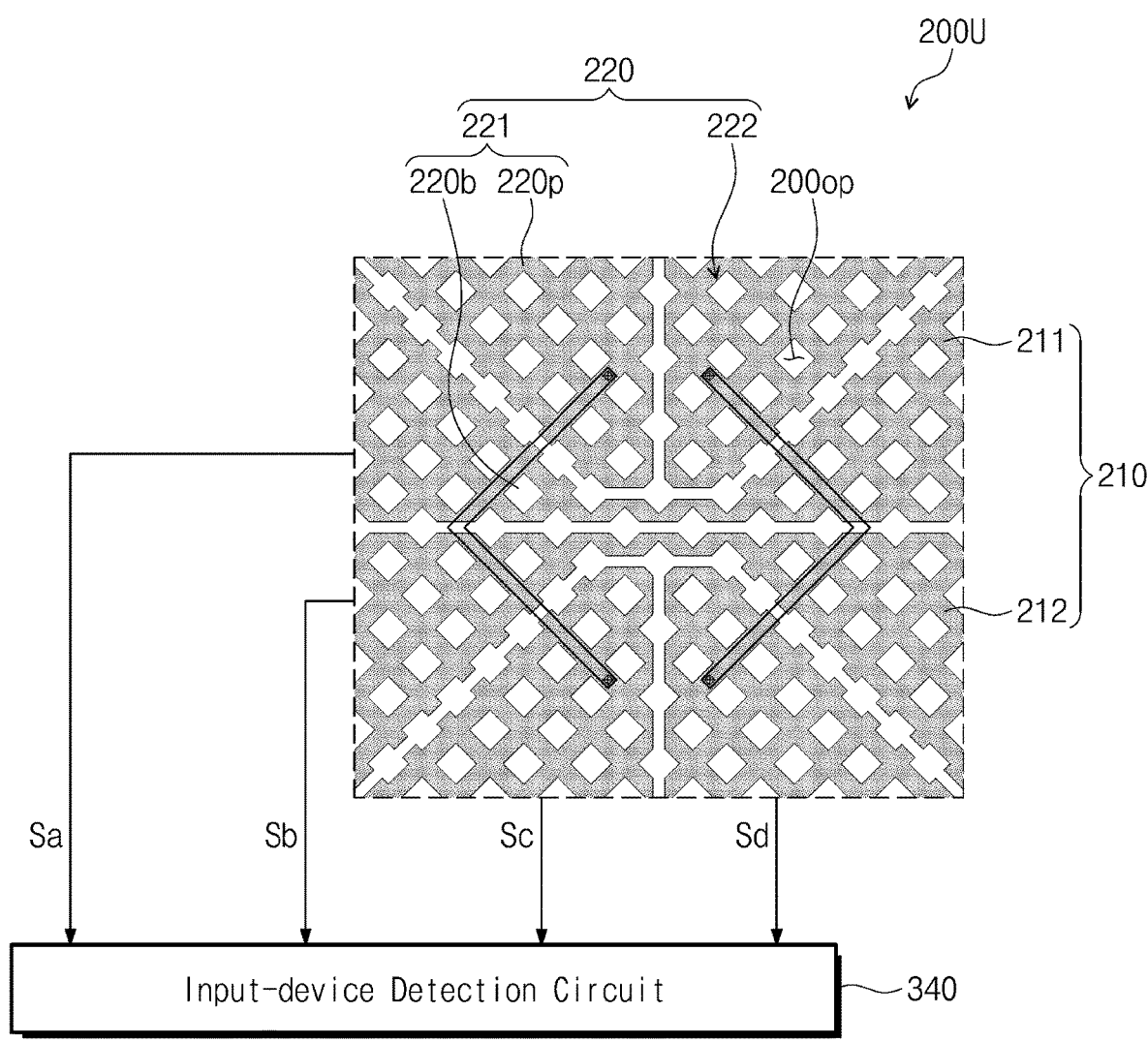
FIG. 7B is a schematic diagram showing how a sensor layer detects an input from an input device according to some example embodiments of the present disclosure.

FIG. 7A is a schematic diagram showing how a sensor layer detects a touch input according to some example embodiments of the present disclosure. FIG. 7B is a schematic diagram showing how a sensor layer detects an input from an input device according to some example embodiments of the present disclosure.

FIGS. 7A and 7B depict one sensing unit 200U and a portion of the sensor control circuit (see 300 of FIG. 4).

Referring to FIGS. 6 and 7A, each of the first and second cross electrodes 221 and 222 may include a plurality of sensing patterns 220p and a plurality of bridge patterns 220b.

The sensing patterns 220p may overlap neither the first electrode 211 nor the second electrode 212, and may be spaced apart from the first electrode 211 and the second electrode 212. The bridge patterns 220b may be electrically connected to two sensing patterns 220p that are spaced apart from each other across the first electrode 211 and the second electrode 212. The bridge pattern 220b may overlap the first electrode 211 and the second electrode 212.

In some example embodiments of the present disclosure, the first electrode 211, the second electrode 212, and the sensing patterns 220p may be located on the same layer. The bridge patterns 220b may be electrically insulated from the first electrode 211 and the second electrode 212. Therefore, the bridge patterns 220b may be located on a different layer from that on which the first and second electrodes 211 and 212 are located.

For example, the bridge patterns 220b may be included in the first conductive layer (see 202 of FIG. 5), and the first electrode 211, the second electrode 212, and the sensing patterns 220p may be included in the second conductive layer (see 204 of FIG. 5). Embodiments according to the present disclosure, however, are not limited thereto, and in some example embodiments of the present disclosure, the bridge patterns 220b may be included in the second conductive layer 204, while the first electrode 211, the second electrode 212, and the sensing patterns 220p may be included in the first conductive layer 202.

The first electrode 211, the second electrode 212, and the sensing patterns 220p may have their mesh structures. An opening 200op defined by the mesh structure may overlap the light emitting region PXA discussed in FIG. 5.

Under the first mode, the first sensing electrode 210 may serve as a TX electrode (or transmitting electrode), and the second sensing electrode 220 may serve as an RX electrode (or receiving electrode). This, however, is merely an example, and embodiments according to the present disclosure are not limited thereto. For example, according to some example embodiments of the present disclosure, under the first mode, the first sensing electrode 210 may serve as an RX electrode (or receiving electrode), and the second sensing electrode 220 may serve as a TX electrode (or transmitting electrode). The following will discuss an example in which, under the first mode, the first sensing electrode 210 serves as the TX electrode, and the second sensing electrode 220 serves as the RX electrode.

Under the first mode, the signal generation circuit 320 may provide the first sensing electrode 210 with a first signal S1 and a second signal S2. For example, the signal generation circuit 320 may provide the first electrode 211 with the first signal S1 and may provide the second electrode 212 with the second signal S2. The first signal S1 and the second signal S2 may have the same waveform, and at the same time, may be respectively provided to the first electrode 211 and the second electrode 212.

Under the first mode, the touch detection circuit 330 may receive detection signals S3 and S4 from the second sensing electrode 220. According to some example embodiments of the present disclosure, the second sensing electrode 220 may include the first cross electrode 221 and the second cross electrode 222, and the first and second cross electrodes 221 and 222 may be electrically separated from each other. Therefore, the touch detection circuit 330 may receive a third detection signal S3 from the first cross electrode 221 and a fourth detection signal S4 from the second cross electrode 222.

The touch detection circuit 330 may have an algorithm through which the third detection signal S3 and the fourth detection signal S4 are added up. For example, the touch detection circuit 330 may sum up the third detection signal S3 and the fourth detection signal S4.

When the second sensing electrode 220 is not divided into the first cross electrode 221 and the second cross electrode 222, a signal received from the second sensing electrode 220 may have a waveform that is substantially the same as a sum of a waveform of a signal received from the first cross electrode 221 and a waveform of a signal received from the second cross electrode 222. Accordingly, even when the second sensing electrode 220 is divided into the first cross electrode 221 and the second cross electrode 222, a mutual capacitance and its variation may be absent or slightly present between the first sensing electrode 210 and the second sensing electrode 220.

In this sense, according to some example embodiments of the present disclosure, one sensing unit node may be defined by the first electrode 211 and the second electrode 212 that are electrically separated from each other in the sensor layer 200 and by the first cross electrode 221 and the second cross electrode 222 that are electrically separated from each other in the sensor layer 200.

Referring to FIGS. 6 and 7B, when the input device (see 2000 of FIG. 4) approaches the sensor layer (see 200 of FIG. 4), the sensor layer 200 may enter an input-device detection mode under the second mode.

Under the input-device detection mode, each of the first and second sensing electrodes 210 and 220 may output to the input-device detection circuit 340 a detection signal whose waveform is deformed due to a TX signal provided from the input device 2000. For example, under the second mode, the input-device detection circuit 340 may receive a first detection signal Sa from the first electrode 211, a second detection signal Sb from the second electrode 212, a third detection signal Sc from the first cross electrode 221, and a fourth detection signal Sd from the second cross electrode 222.

In such cases, when the sensor layer 200 enters the input-device detection mode, the first sensing electrode 210 and the second sensing electrode 220 may all serve as the RX electrode.

According to some example embodiments of the present disclosure, the sensor layer 200 may be used to sense all of a coordinate of the touch (see 3000 of FIG. 4) and a coordinate of the input device 2000. In such cases, there may be no requirement of a separate layer for detecting the coordinate of the input device 2000. Therefore, it may be possible to reduce a thickness of the electronic device 1000 of FIG. 1 or 1000_1 of FIG. 2A. In addition, the reduction in thickness of the display layer 100 and the sensor layer 200 may increase flexibility, the sensor layer 200 may be applicable to the foldable electronic device 1000_1 of FIG. 2A.

According to some example embodiments of the present disclosure, the first sensing electrode 210 may be electrically divided into the first electrode 211 and the second electrode 212, and the second sensing electrode 220 may be electrically divided into the first cross electrode 221 and the second cross electrode 222. Therefore, compared to a pre-divided first sensing electrode, each of the first and second electrodes 211 and 212 may have a parasitic capacitance component that is reduced to half or less. In addition, compared to a pre-divided second sensing electrode, each of the first and second cross electrodes 221 and 222 may have a parasitic capacitance component that is reduced to half or less. In such cases, the reduction in parasitic capacitance component may allow the sensor layer 200 to have an increased sensitivity of detection.

Figure 8:
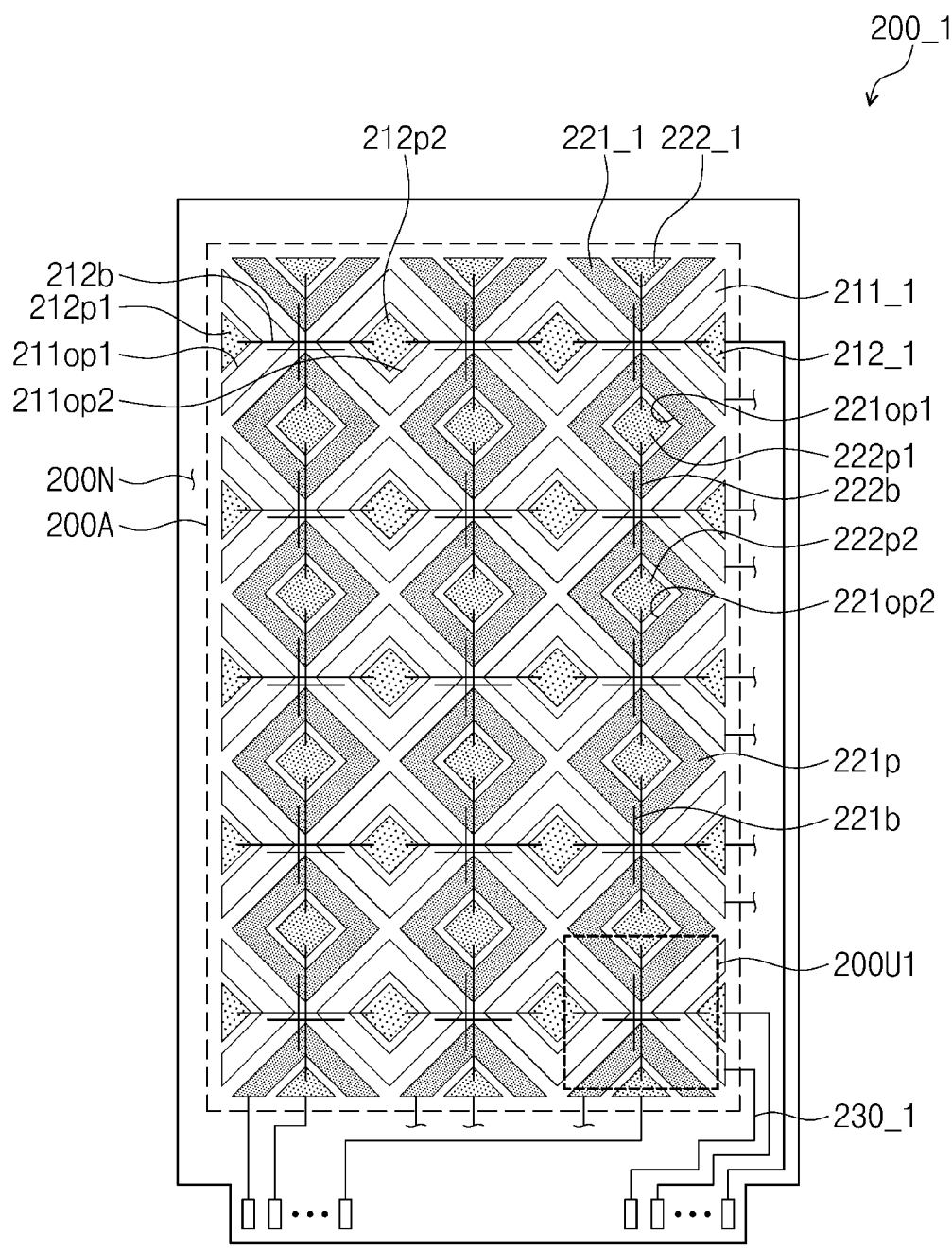
FIG. 8 is a plan view showing a sensor layer according to some example embodiments of the present disclosure.

FIG. 8 illustrates a plan view showing a sensor layer according to some example embodiments of the present disclosure.

Referring to FIG. 8, a sensor layer 200_1 may include a first electrode 211_1, a second electrode 212_1, a first cross electrode 221_1, a second cross electrode 222_1, and sensing lines 230_1. The first electrode 211_1, the second electrode 212_1, the first cross electrode 221_1, and the second cross electrode 222_1 may be located on the detection region 200A. The sensing lines 230_1 may be located on the peripheral region 200N.

Each of the first and second electrodes 211_1 and 212_1 may extend along the first direction DR1, and each of the first and second cross electrodes 221_1 and 222_2 may extend along the second direction DR2.

A portion of the first electrode 211_1 may overlap a portion of the second electrode 212_1, and a portion of the first cross electrode 221_1 may overlap a portion of the second cross electrode 222_1. When viewed in the third direction DR3 or a thickness direction of the sensor layer 200_1, the second electrode 212_1 may be surrounded by the first electrode 211_1, and the second cross electrode 222_1 may be surrounded by the first cross electrode 221_1.

A plurality of openings may be defined in the first electrode 211_1. For example, the plurality of openings may include a first opening 211op1 and a second opening 211op2 that is spaced apart in the first direction DR1 from the first opening 211op1.

The second electrode 212_1 may include a first sensing pattern 212p1 arranged in the first opening 211op1, a second sensing pattern 212p2 arranged in the second opening 211op2, and a bridge pattern 212b electrically connected to the first sensing pattern 212p1 and the second sensing pattern 212p2.

The first sensing pattern 212p1 and the second sensing pattern 212p2 may be located on the same layer as that on which the first electrode 211_1 is located, and may each be surrounded by the first electrode 211_1. The bridge pattern 212b may be insulated from and intersect the first electrode 211_1, and may be located on a different layer from that on which the first electrode 211_1 is located.

The first cross electrode 221_1 may include a plurality of sensing patterns 221p and a plurality of bridge patterns 221b. The sensing patterns 221p may be spaced apart from each other across the first electrode 211_1. The bridge patterns 221b may be electrically connected to two sensing patterns 221p. The bridge patterns 221b may overlap the first electrode 211_1.

A plurality of cross openings may be defined in the first cross electrode 221_1. For example, the plurality of cross openings may include a first cross opening 221op1 and a second cross opening 221op2 that is spaced apart in the second direction DR2 from the first cross opening 221op1. For example, the first cross opening 221op1 may be defined in one sensing pattern 221p, and the second cross opening 221op2 may be defined in another sensing pattern 221p.

The second cross electrode 222_1 may include a first cross sensing pattern 222p1 arranged in the first cross opening 221op1, a second cross sensing pattern 222p2 arranged in the second cross opening 221op2, and a cross bridge pattern 222b electrically connected to the first cross sensing pattern 222p1 and the second cross sensing pattern 222p2.

The first cross sensing pattern 222p1 and the second cross sensing pattern 222p2 may be located on the same layer as that on which the first cross electrode 221_1 is located, and may each be surrounded by the first cross electrode 221_1. The cross bridge pattern 222b may be insulated from and intersect the first cross electrode 221_1, and may be located on a different layer from that on which the first cross electrode 221_1 is located.

For example, the bridge patterns 221b, the cross bridge pattern 222b, and the bridge pattern 212b may be included in the first conductive layer (see 202 of FIG. 5), while the first electrode 211_1, the first sensing pattern 212p1, the second sensing pattern 212p2, the sensing patterns 221p, the first cross sensing pattern 222p1, and the second cross sensing pattern 222p2 may be included in the second conductive layer (see 204 of FIG. 5). Embodiments according to the present disclosure, however, are not limited thereto, and in some example embodiments of the present disclosure, the bridge patterns 221b, the cross bridge pattern 222b, and the bridge pattern 212b may be included in the second conductive layer 204, while the first electrode 211_1, the first sensing pattern 212p1, the second sensing pattern 212p2, the sensing patterns 221p, the first cross sensing pattern 222p1, and the second cross sensing pattern 222p2 may be included in the first conductive layer 202.

Figure 9A:
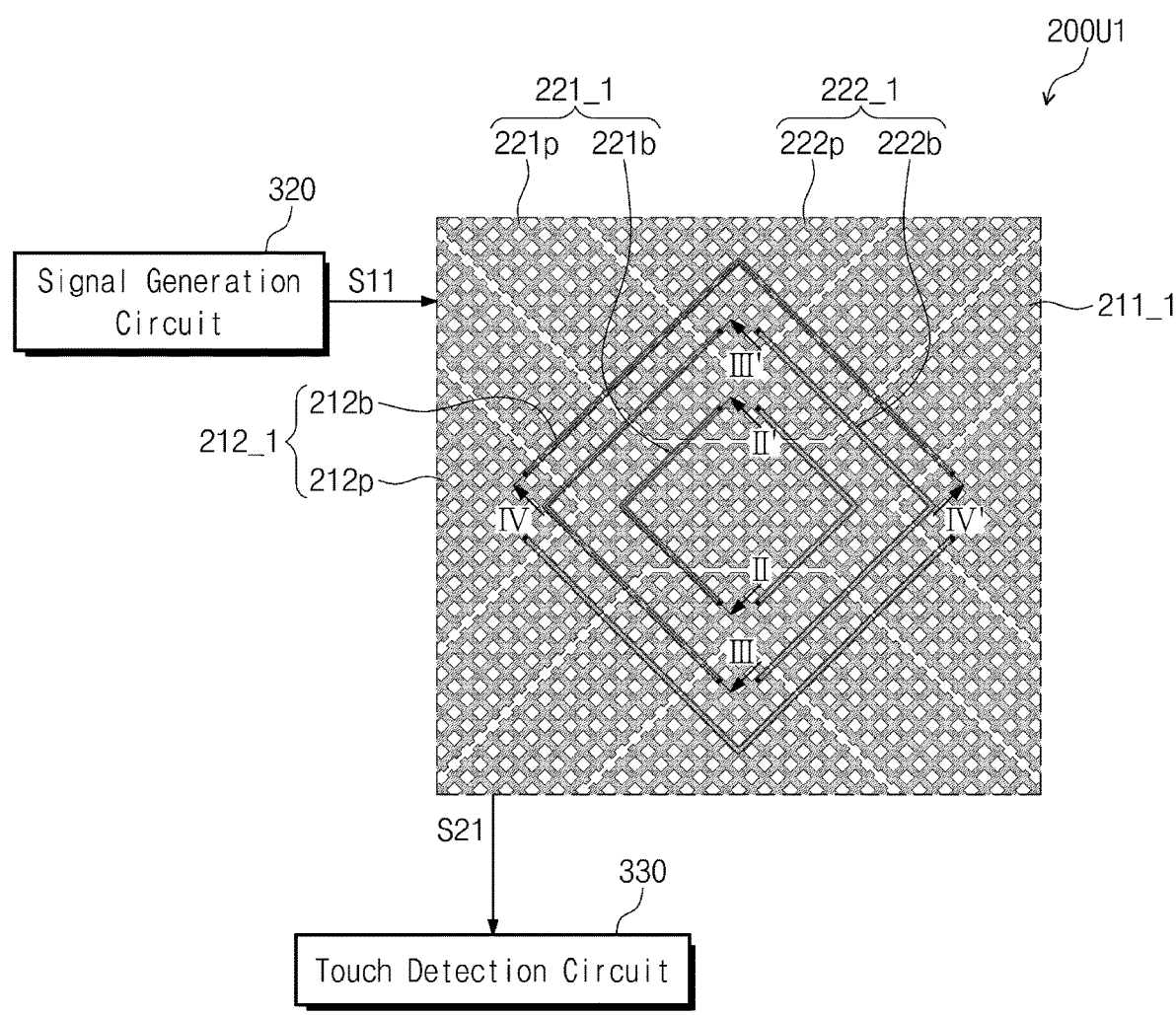
FIG. 9A is a schematic diagram showing how a sensor layer detects a touch input according to some example embodiments of the present disclosure.
Figure 9B:
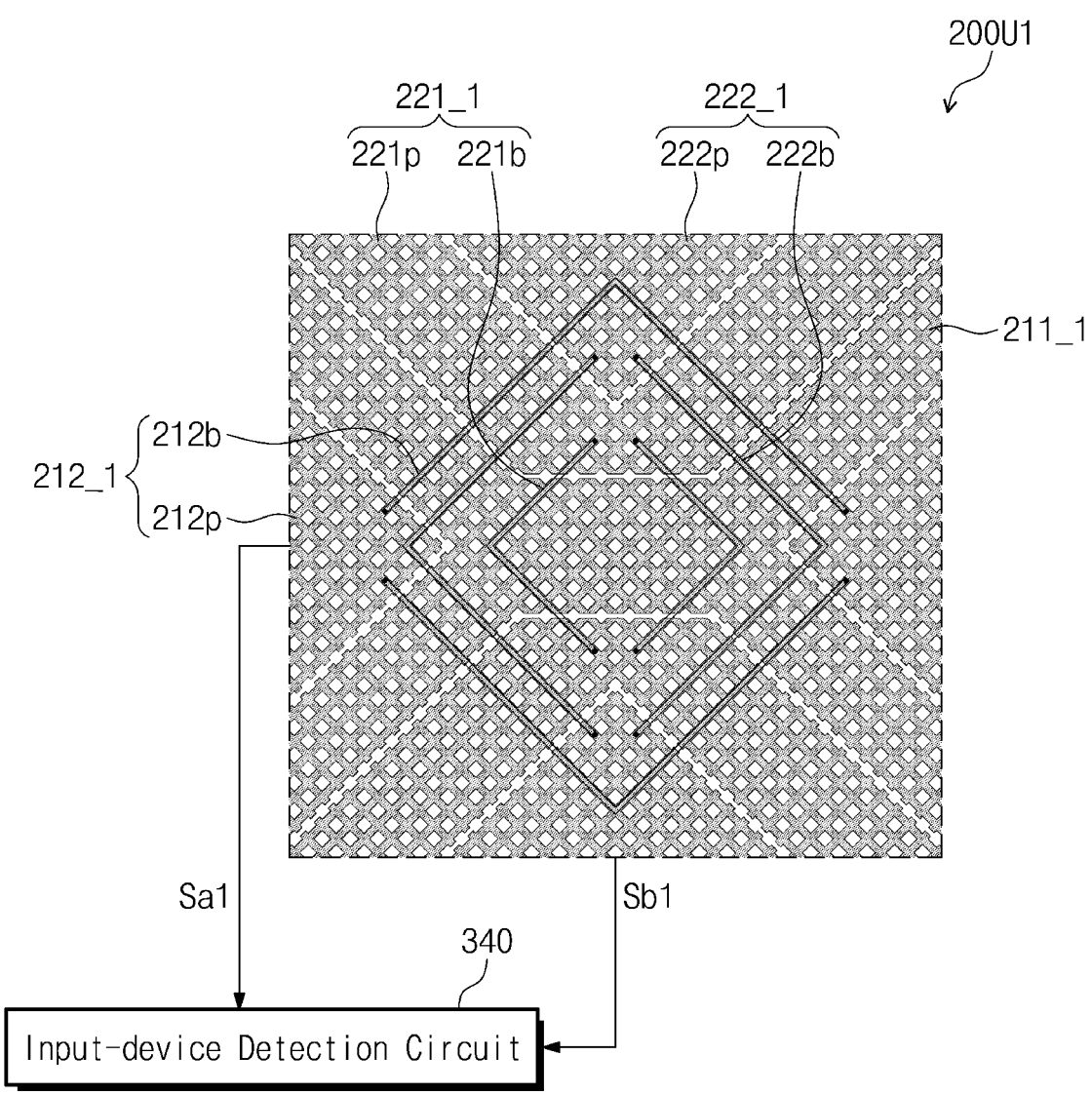
FIG. 9B is a schematic diagram showing how a sensor layer detects an input from an input device according to some example embodiments of the present disclosure.

FIG. 9A illustrates a schematic diagram showing how a sensor layer detects a touch input according to some example embodiments of the present disclosure. FIG. 9B illustrates a schematic diagram showing how a sensor layer detects an input from an input device according to some example embodiments of the present disclosure. FIGS. 9A and 9B depict one sensing unit 200U1 and a portion of the sensor control circuit (see 300 of FIG. 4).

Referring to FIGS. 8 and 9A, under the first mode, the signal generation circuit 320 may provide the first electrode 211_1 with a signal S11. Under the first mode, the touch detection circuit 330 may receive a detection signal S21 from the first cross electrode 221_1. When the sensor layer 200_1 operates under the first mode, the second electrode 212_1 and the second cross electrode 222_1 may each be floated or grounded.

Referring to FIGS. 8 and 9B, under the input-device detection mode, the second electrode 212_1 and the second cross electrode 222_1 may each output to the input-device detection circuit 340 a detection signal whose waveform is deformed due to a TX signal provided from the input device (see 2000 of FIG. 4).

For example, the input-device detection circuit 340 may receive a first detection signal Sa1 from the second electrode 212_1 and a second detection signal Sb1 from the second cross electrode 222_1. When the sensor layer 200_1 operates under the input-device detection mode, the first electrode 211_1 and the first cross electrode 221_1 may each be floated or grounded.

According to some example embodiments of the present disclosure, without addition of a conductive layer other than the first conductive layer (see 202 of FIG. 5) and the second conductive layer (see 204 of FIG. 5), the sensor layer 200_1 may be provided therein with the first cross electrode 221_1 and the first electrode 211_1 for detecting an input from the touch (see 3000 of FIG. 4) and with the second cross electrode 222_1 and the second electrode 212_1 for detecting an input from the input device (see 2000 of FIG. 4). Therefore, a thickness of the sensor layer 200_1 may not increase even when the sensor layer 200_1 detects inputs from the touch 3000 and the input device 2000 as well, and accordingly the sensor layer 200_1 may be applicable to the foldable electronic device 1000_1 of FIG. 2A.

Figure 10:
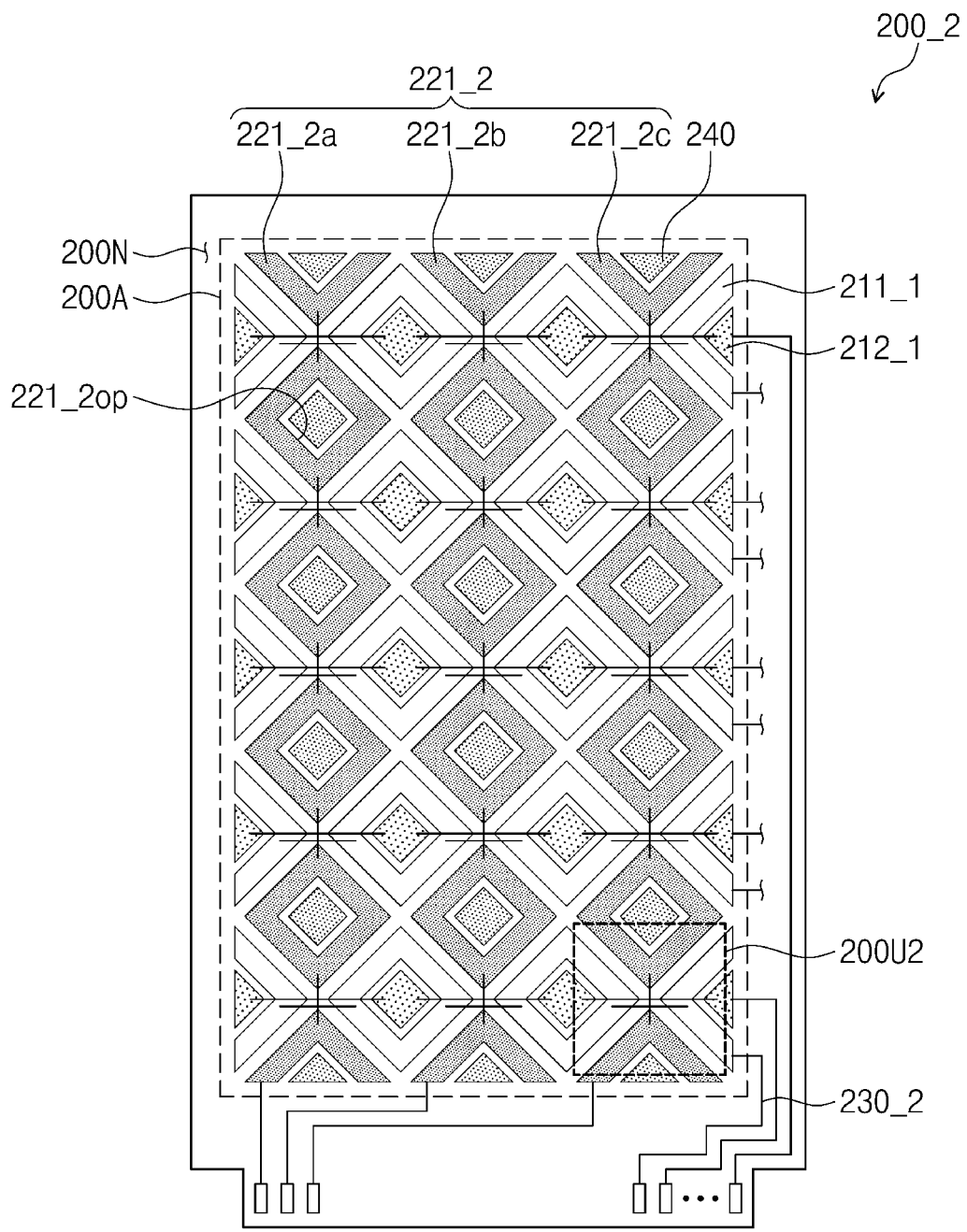
FIG. 10 is a plan view showing a sensor layer according to some example embodiments of the present disclosure.

FIG. 10 illustrates a plan view showing a sensor layer according to some example embodiments of the present disclosure.

Referring to FIG. 10, a sensor layer 200_2 may include a first electrode 211_1, a second electrode 212_1, a cross electrode 221_2, a dummy pattern 240, and sensing lines 230_2. The first electrode 211_1, the second electrode 212_1, the cross electrode 221_2, and the dummy pattern 240 may be arranged in the detection region 200A. The sensing lines 230_2 may be arranged in the peripheral region 200N.

Each of the first and second electrodes 211_1 and 212_1 may extend along the first direction DR1. The cross electrode 221_2 may extend along the second direction DR2. The cross electrode 221_2 may include a first cross electrode 221_2a, a second cross electrode 221_2b, and a third cross electrode 221_2c. The first cross electrode 221_2a, the second cross electrode 221_2b, and the third cross electrode 221_2c may be spaced apart from each other in the first direction DR1 and may not overlap each other.

A plurality of openings 221_2op may be defined in each of the first cross electrode 221_2a, the second cross electrode 221_2b, and the third cross electrode 221_2c. The dummy pattern 240 may be arranged in each of the openings 221_2op. The dummy pattern 240 may be an electrically floated pattern.

Figure 11A:
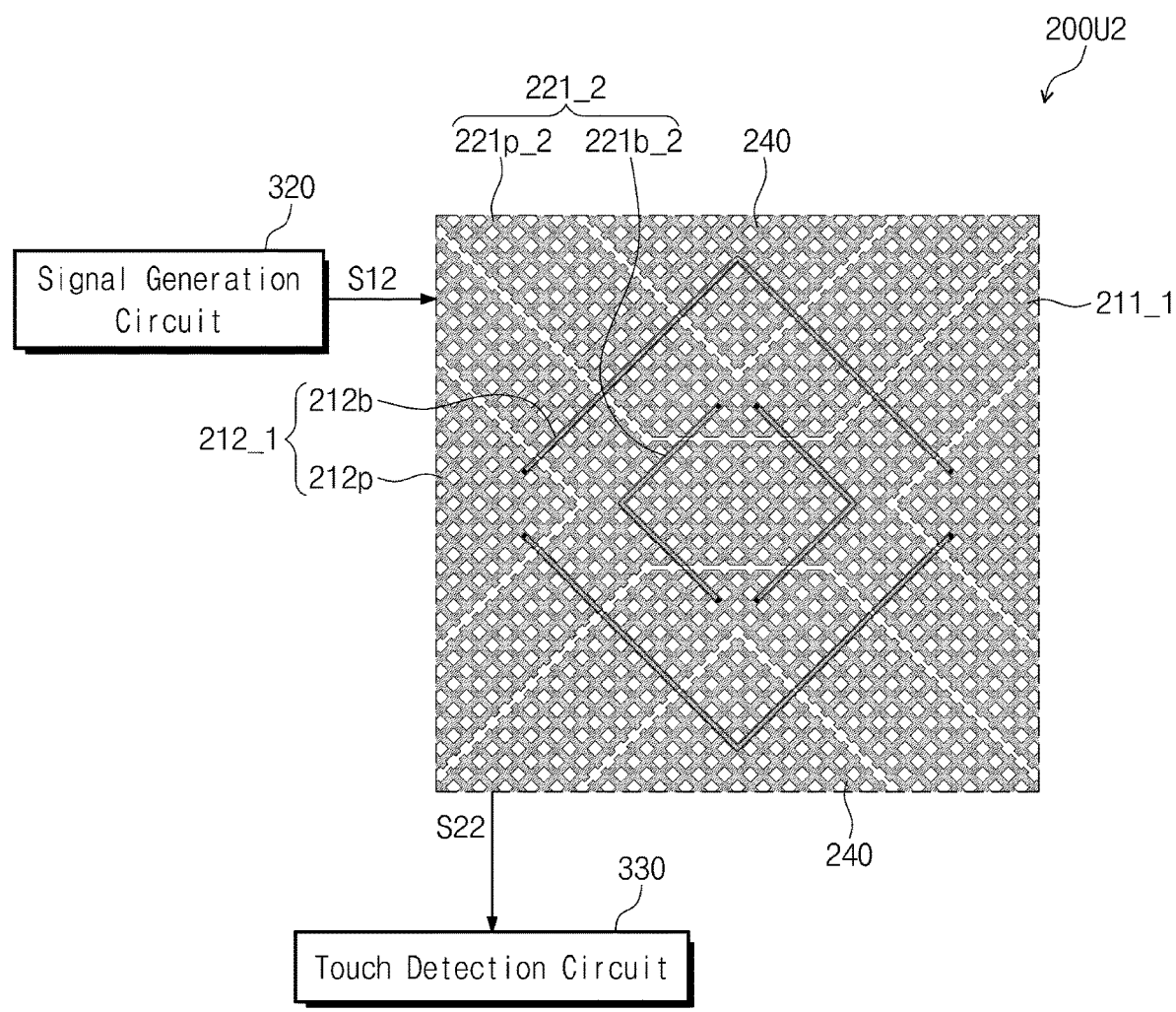
FIG. 11A is a schematic diagram showing how a sensor layer detects a touch input according to some example embodiments of the present disclosure.
Figure 11B:
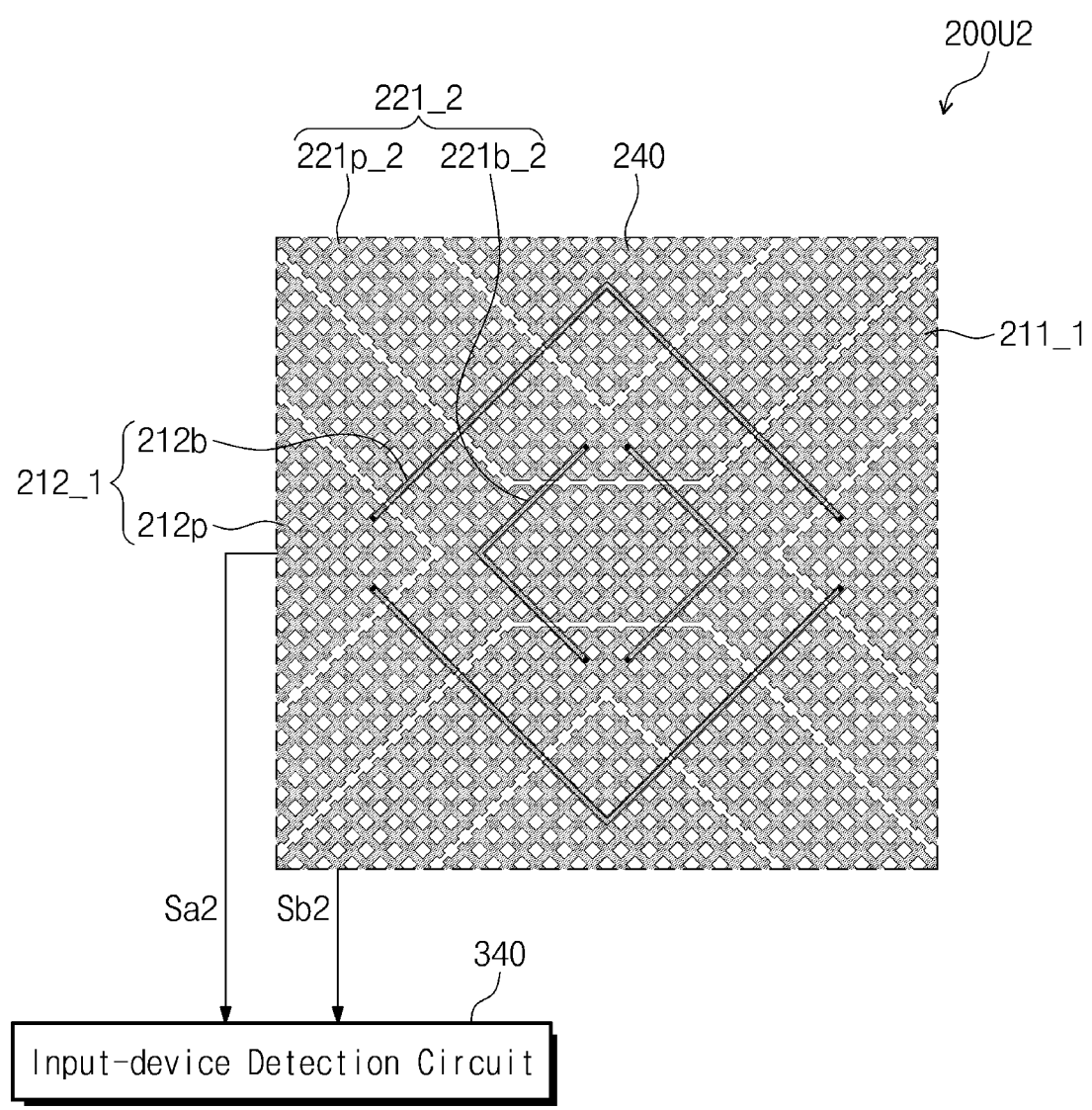
FIG. 11B is a schematic diagram showing how a sensor layer detects an input from an input device according to some example embodiments of the present disclosure.

FIG. 11A illustrates a schematic diagram showing how a sensor layer detects a touch input according to some example embodiments of the present disclosure. FIG. 11B illustrates a schematic diagram showing how a sensor layer detects an input from an input device according to some example embodiments of the present disclosure. FIGS. 11A and 11B depict one sensing unit 200U2 and a portion of the sensor control circuit (see 300 of FIG. 4).

Referring to FIGS. 11A and 11B, the cross electrode 221_2 may include a plurality of sensing patterns 221p_2 and a plurality of bridge patterns 221b_2.

The sensing patterns 221p_2 may be spaced apart from each other across the first electrode 211_1. The bridge patterns 221*b*_2 may be electrically connected to two sensing patterns 221*p*_2. The bridge patterns 221*b*_2 may overlap the first electrode 211_1.

Referring to FIGS. 10 and 11A, under the first mode, the signal generation circuit 320 may provide the first electrode 211_1 with a signal S12. Under the first mode, the touch detection circuit 330 may receive a detection signal S22 from the cross electrode 221_2. For example, under the first mode, the touch detection circuit 330 may sequentially receive detection signals S22 from the first cross electrode 221_2*a*, the second cross electrode 221_2*b*, and the third cross electrode 221_2*c*. When the sensor layer 200_2 operates under the first mode, the second electrode 212_1 may be floated or grounded.

Referring to FIGS. 10 and 11B, under the input-device detection mode, the second electrode 212_1 and the cross electrode 221_2 may each output to the input-device detection circuit 340 a detection signal whose waveform is deformed due to a TX signal provided from the input device (see 2000 of FIG. 4).

For example, the input-device detection circuit 340 may receive a first detection signal Sa2 from the second electrode 212_1 and a second detection signal Sb2 from the cross electrode 221_2. When the sensor layer 200_2 operates under the input-device detection mode, the first electrode 211_1 may be floated or grounded.

Figure 12:
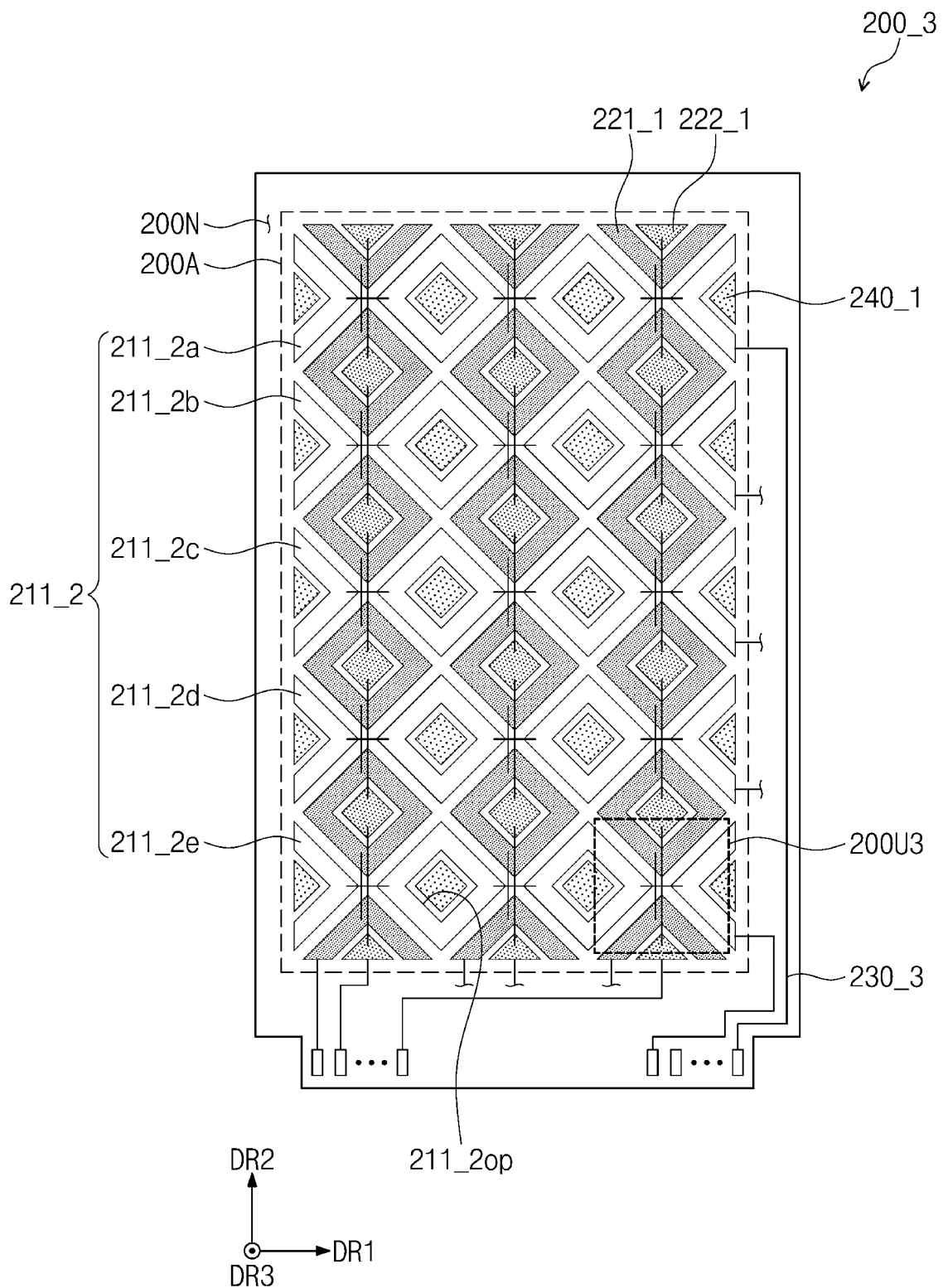
FIG. 12 is a plan view showing aspects of a sensor layer according to some example embodiments of the present disclosure.

FIG. 12 illustrates a plan view showing a sensing layer according to some example embodiments of the present disclosure.

Referring to FIG. 12, a sensor layer 200_3 may include an electrode 211_2, a first cross electrode 221_1, a second cross electrode 222_1, a dummy pattern 240_1, and sensing lines 230_3. The electrode 211_2, the first cross electrode 221_1, the second cross electrode 222_1, and the dummy pattern 240_1 may be arranged in the detection region 200A. The sensing lines 230_3 may be arranged in the peripheral region 200N.

The electrode 211_2 may extend along the first direction DR1, and the first and second cross electrodes 221_1 and 222_1 may extend along the second direction DR2. The electrode 211_2 may include first, second, third, fourth, and fifth electrodes 211_2*a*, 211_2*b*, 211_2*c*, 211_2*d*, and 211_2*e*. The first, second, third, fourth, and fifth electrodes 211_2*a*, 211_2*b*, 211_2*c*, 211_2*d*, and 211_2*e* may be spaced apart from each other and may not overlap each other.

A plurality of openings 211_2*op* may be defined in each of the first, second, third, fourth, and fifth electrodes 211_2*a*, 211_2*b*, 211_2*c*, 211_2*d*, and 211_2*e*. The dummy pattern 240_1 may be located in each of the openings 211_2*op*. The dummy pattern 240_1 may be an electrically floated pattern.

Figure 13A:
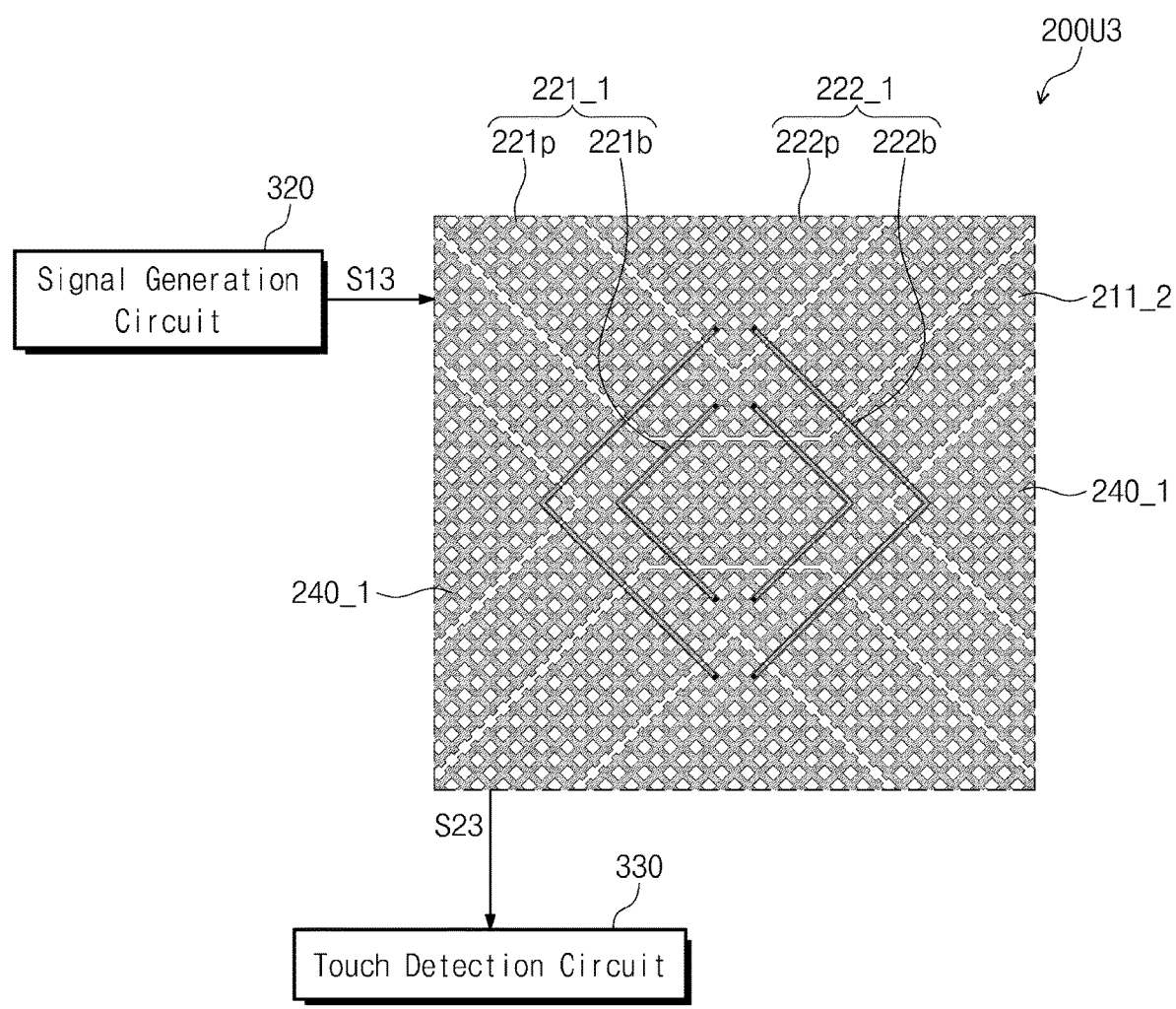
FIG. 13A is a schematic diagram showing how a sensor layer detects a touch input according to some example embodiments of the present disclosure.
Figure 13B:
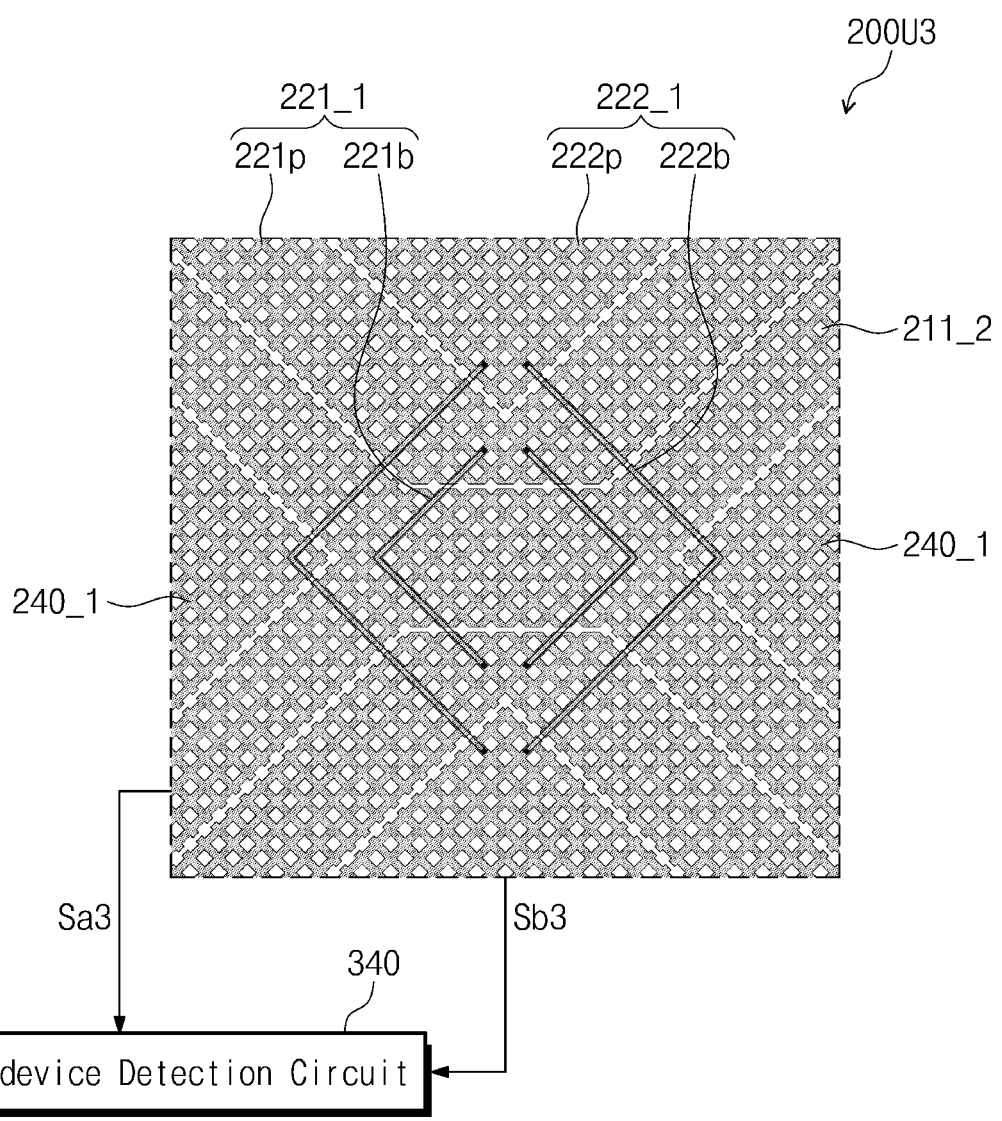
FIG. 13B is a schematic diagram showing how a sensor layer detects an input from an input device according to some example embodiments of the present disclosure.

FIG. 13A is a schematic diagram showing how a sensor layer detects a touch input according to some example embodiments of the present disclosure. FIG. 13B is a schematic diagram showing how a sensor layer detects an input from an input device according to some example embodiments of the present disclosure.

FIGS. 13A and 13B depict one sensing unit 200U3 and a portion of the sensor control circuit (see 300 of FIG. 4).

Referring to FIGS. 12 and 13A, under the first mode, the signal generation circuit 320 may provide the electrode 211_2 with a signal S13. For example, the signal generation circuit 320 may sequentially provide the signal S13 to the first, second, third, fourth, and fifth electrodes 211_2*a*, 211_2*b*, 211_2*c*, 211_2*d*, and 211_2*e*.

Under the first mode, the touch detection circuit 330 may receive a detection signal S23 from the first cross electrode 221_1. When the sensor layer 200_3 operates under the first mode, the second cross electrode 222_1 may be floated or grounded.

Referring to FIGS. 12 and 13B, under the input-device detection mode, the electrode 211_2 and the second cross electrode 222_1 may each output to the input-device detection circuit 340 a detection signal whose waveform is deformed due to a TX signal provided from the input device (see 2000 of FIG. 4).

For example, the input-device detection circuit 340 may receive a first detection signal Sa3 from the electrode 211_2 and a second detection signal Sb3 from the second cross electrode 222_1. When the sensor layer 200_3 operates under the input-device detection mode, the first cross electrode 221_1 may be floated or grounded.

Figure 14:
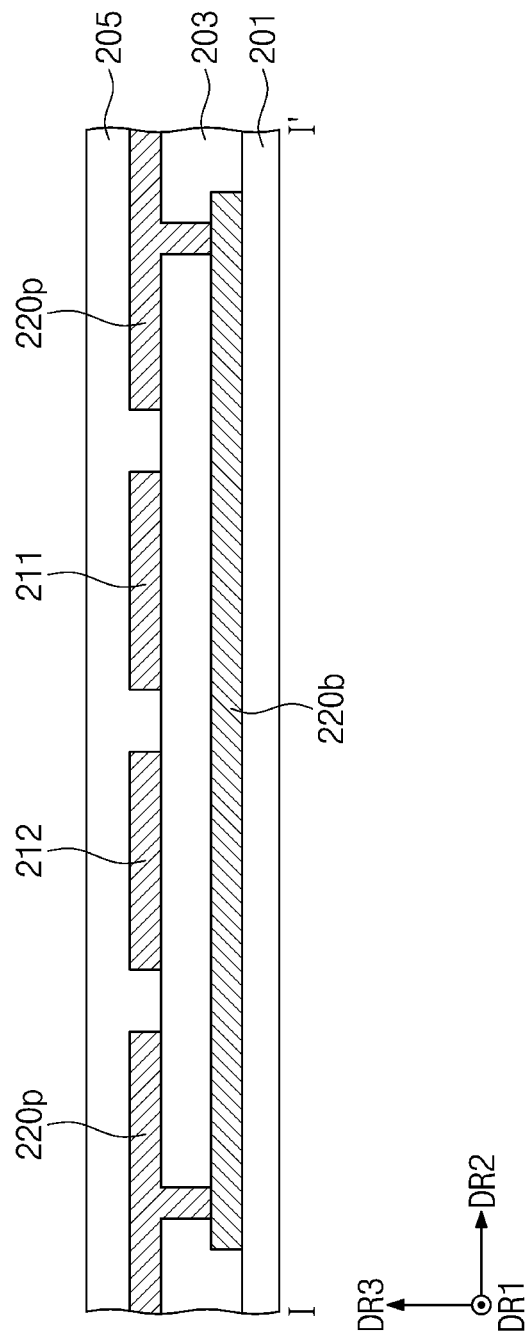
FIG. 14 illustrates a cross-sectional view taken along the line I-I' of FIG. 7A.

FIG. 14 is a cross-sectional view taken along the line I-I' of FIG. 7A.

Referring to FIGS. 7A and 14, the bridge pattern 220*b* may be electrically connected to the sensing patterns 220*p*.

The bridge pattern 220*b* may be located between the base layer 201 and the sensing insulating layer 203. The sensing patterns 220*p* may be located between the sensing insulating layer 203 and the cover insulating layer 205. Each of the sensing patterns 220*p* may penetrate the sensing insulating layer 203 and may contact the bridge pattern 220*b*. The bridge pattern 220*b* may be arranged closer than the sensing patterns 220*p* to the display layer (see 100 of FIG. 5). A structure as shown in FIG. 14 may be called a bottom bridge structure.

The bridge pattern 220*b* may be insulated from and intersect each of the first electrode 211 and the second electrode 212. The first electrode 211 and the second electrode 212 may be located on the same layer as that on which the sensing patterns 220*p* are located, and may each be insulated from the sensing patterns 220*p*.

Figure 15:
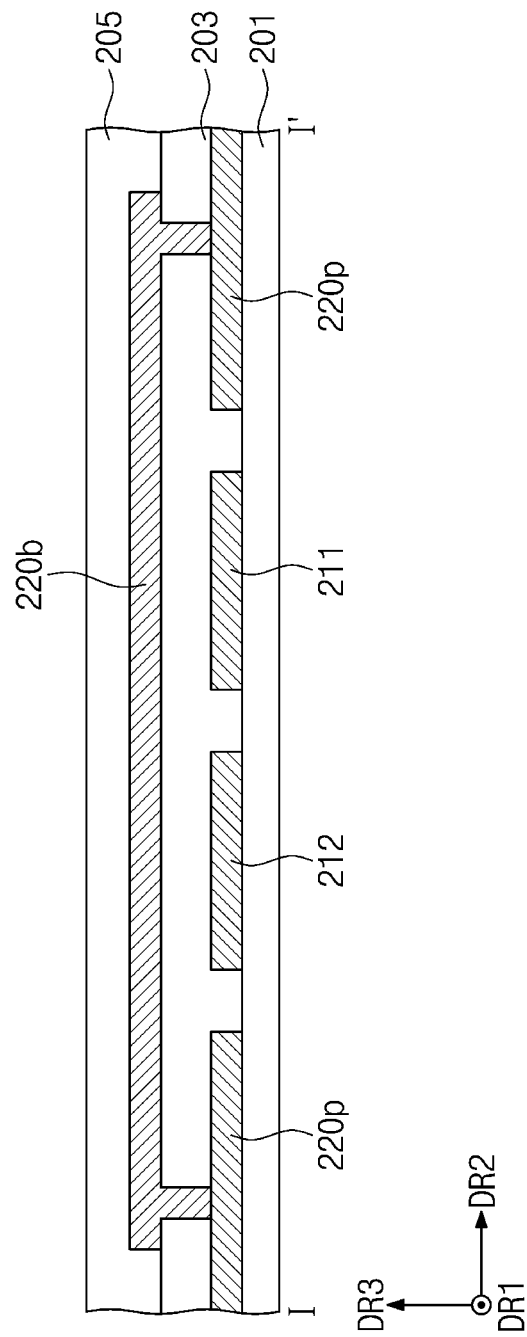
FIG. 15 illustrates a cross-sectional view taken along the line I-I' of FIG. 7A.

FIG. 15 is a cross-sectional view taken along the line I-I' of FIG. 7A.

Referring to FIGS. 7A and 15, the bridge pattern 220*b* may be electrically connected to the sensing patterns 220*p*.

The sensing patterns 220*p* may be located between the base layer 201 and the sensing insulating layer 203. The bridge pattern 220*b* may be located between the sensing insulating layer 203 and the cover insulating layer 205. The bridge pattern 220*b* may penetrate the sensing insulating layer 203 and may contact the sensing patterns 220*p*. The bridge pattern 220*b* may be arranged farther than the sensing patterns 220*p* away from the display layer (see 100 of FIG. 5). A structure as shown in FIG. 15 may be called a top bridge structure.

The bridge pattern 220*b* may be insulated from and intersect each of the first electrode 211 and the second electrode 212. The first electrode 211 and the second electrode 212 may be located on the same layer as that on which the sensing patterns 220*p* are located, and may each be insulated from the sensing patterns 220*p*.

Figure 16:
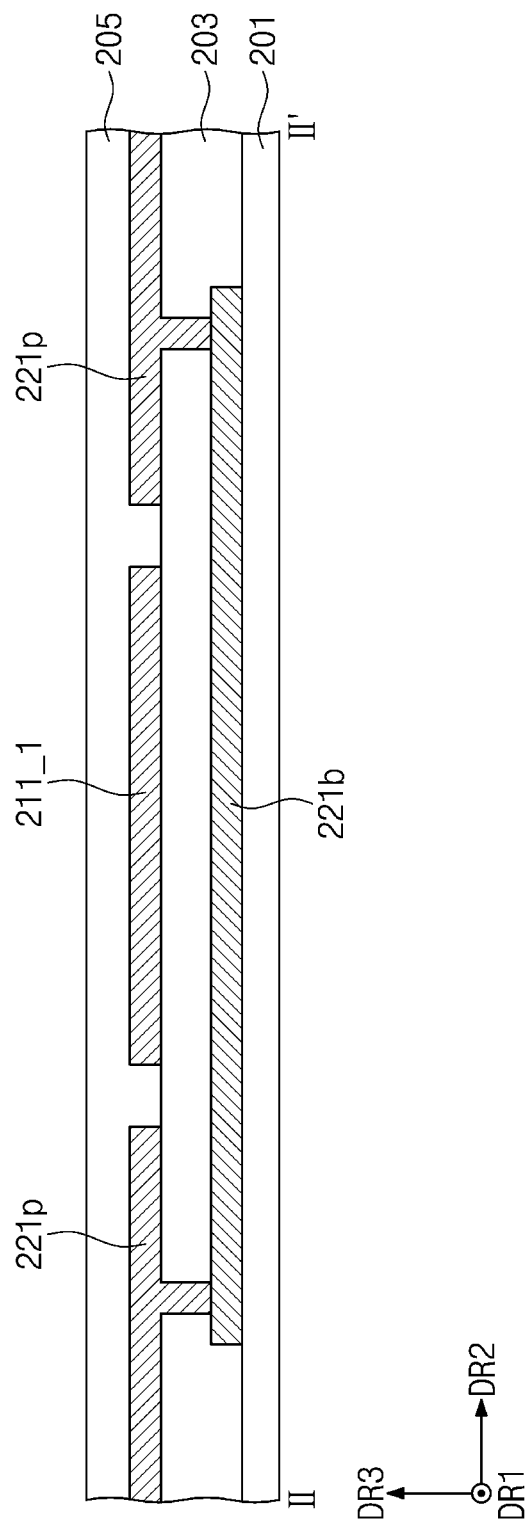
FIG. 16 illustrates a cross-sectional view taken along the line II-II' of FIG. 9A.

FIG. 16 is a cross-sectional view taken along the line II-II' of FIG. 9A.

Referring to FIGS. 9A and 16, the bridge pattern 221*b* may be electrically connected to the sensing patterns 221*p*. The first electrode 211_1 may be located between the sensing patterns 221*p* that are spaced apart from each other. Accordingly, the bridge pattern 221*b* may be insulated from and intersect the first electrode 211_1.

Figure 17:
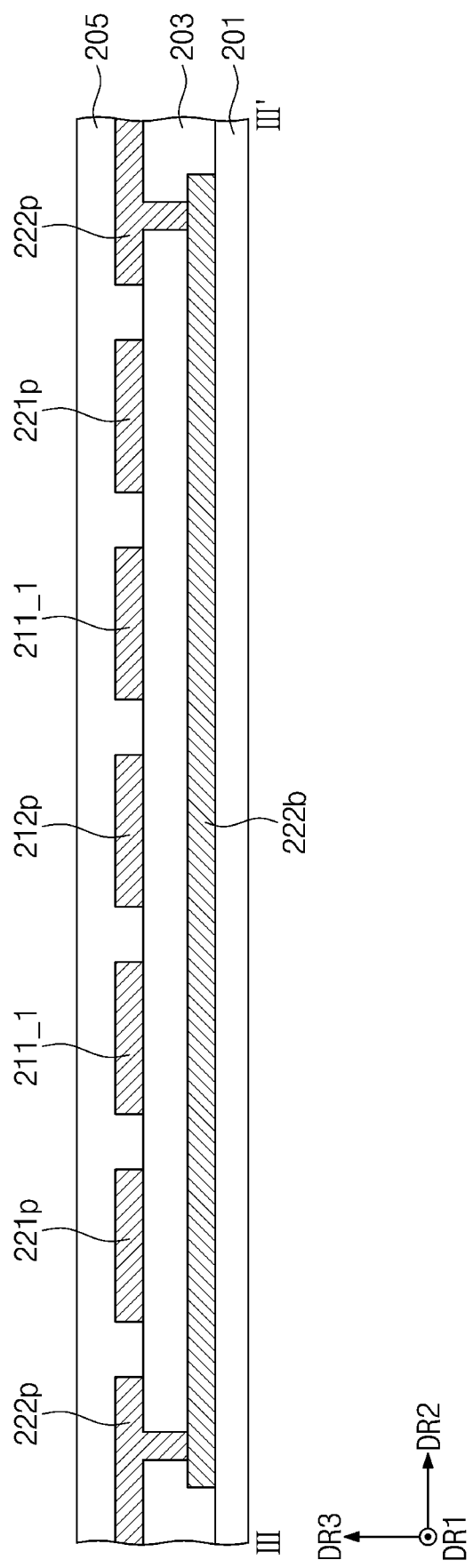
FIG. 17 illustrates a cross-sectional view taken along the line III-III' of FIG. 9A.

FIG. 17 is a cross-sectional view taken along the line III-III' of FIG. 9A.

Referring to FIGS. 9A and 17, the cross bridge pattern 222*b* may be electrically connected to the cross sensing patterns 222p. The cross bridge pattern 222b may be insulated from and intersect the first electrode 211_1, and the sensing pattern 212p, and the sensing patterns 221p that are spaced apart from each other. The cross bridge pattern 222b may be located between the base layer 201 and the sensing insulating layer 203, while the cross sensing patterns 222p, the sensing patterns 221p, the first electrode 211_1 and the sensing pattern 212p may be located between the sensing insulating layer 203 and the cover insulating layer 205.

Figure 18:
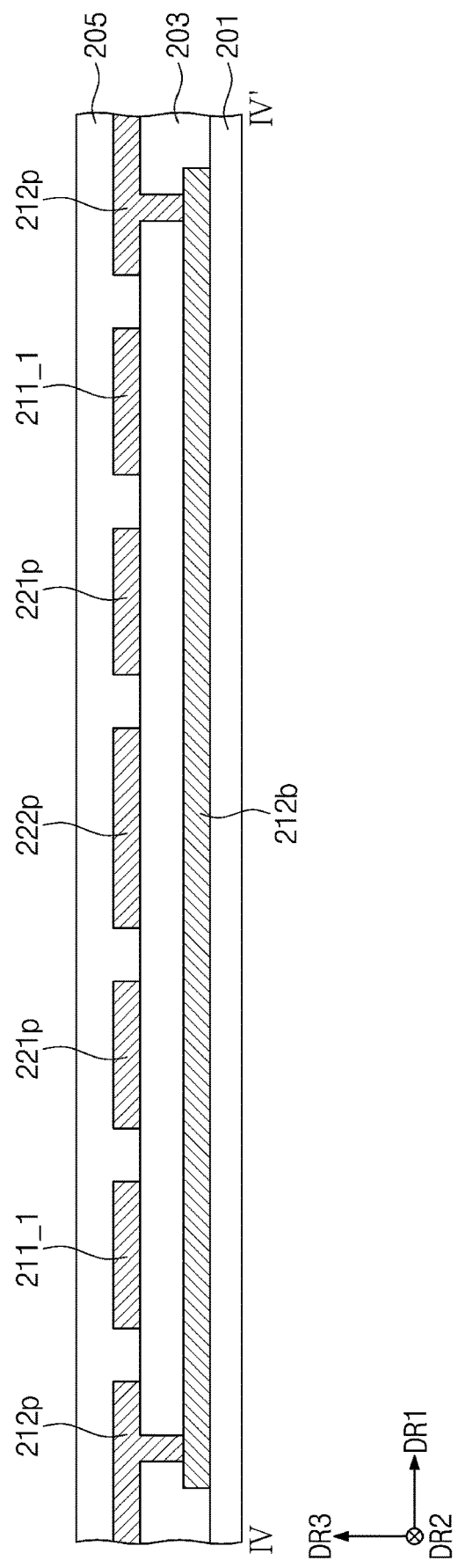
FIG. 18 illustrates a cross-sectional view taken along the line IV-IV' of FIG. 9A.

FIG. 18 is a cross-sectional view taken along the line IV-IV' of FIG. 9A.

Referring to FIGS. 9A and 18, the bridge pattern 212b may be electrically connected to the sensing patterns 212p. The bridge pattern 212b may be insulated from and intersect the first electrode 211_1, the sensing patterns 221p, and the cross sensing pattern 222p. The bridge pattern 212b may be located between the base layer 201 and the sensing insulating layer 203, while the sensing patterns 212p, the first electrode 211_1, the sensing patterns 221p, and the cross sensing pattern 222p may be located between the sensing insulating layer 203 and the cover insulating layer 205.

FIGS. 16 to 18 explain by way of example a bottom bridge structure in which each of the bridge pattern 221b, the cross bridge pattern 222b, and the bridge pattern 212b is located between the base layer 201 and the sensing insulating layer 203, but embodiments according to the present disclosure are not particularly limited thereto. For example, according to some example embodiments of the present disclosure, each of the bridge pattern 221b, the cross bridge pattern 222b, and the bridge pattern 212b may be located between the sensing insulating layer 203 and the cover insulating layer 205.

According to those discussed above, a sensor layer may be used to sense all of a coordinate of touch and a coordinate of an input device. In such cases, there may be no requirement of a separate layer for detecting the coordinate of the input device. Therefore, an electronic device may decrease in thickness. In addition, the reduction in thickness of the sensor layer may relatively increase flexibility, and accordingly the sensor layer may be capable of sensing all of coordinates of the touch and the input device may be applicable to a foldable electronic device.

Although aspects of some example embodiments have been described with reference to a number of illustrative examples thereof, it will be understood by those of ordinary skill in the art that various changes in form and details may be made without departing from the spirit and scope of the present inventive concept as set forth in the following claims. Thus, the technical scope of embodiments according to the present disclosure are not limited by the example embodiments described above, but rather embodiments according to the present disclosure are defined by the following claims and their equivalents.

What is claimed is:

1. An electronic device, comprising:
    a display layer;
    a sensor layer on the display layer and configured to detect a touch input and an input-device input; and
    a sensor control circuit configured to provide the sensor layer with a signal and to receive a detection signal from the sensor layer,
    wherein the sensor layer includes:
        a first electrode that extends along a first direction;
        a second electrode that extends along the first direction;
        a first cross electrode that extends along a second direction intersecting the first direction; and
        a second cross electrode that extends along the second direction,
    wherein the sensor control circuit is configured to detect the touch input based on a variation in mutual capacitance between the first electrode and the first cross electrode, and
    wherein the sensor control circuit is configured to detect the input-device input based on a variation in capacitance of at least one selected from the first electrode and the second electrode and a variation in capacitance of at least one selected from the first cross electrode and the second cross electrode; and
    wherein the sensor control circuit includes a signal generation circuit configured to provide the sensor layer with the signal and a touch detection circuit configured to obtain a touch coordinate based on the detection signal provided from the sensor layer,
    wherein the signal generation circuit is configured to concurrently provide a same signal to the first electrode and the second electrode, and
    wherein the touch detection circuit is configured to obtain the touch coordinate by merging a first detection signal received from the first cross electrode with a second detection signal received from the second cross electrode.

2. The electronic device of claim 1, wherein the sensor control circuit further includes:
    an input-device detection circuit configured to obtain an input-device coordinate based on the detection signal provided from the sensor layer.

3. The electronic device of claim 2, wherein the input-device detection circuit is configured to obtain the input-device coordinate based on a first detection signal received from the first electrode, a second detection signal received from the second electrode, a third detection signal received from the first cross electrode, and a fourth detection signal received from the second cross electrode.

4. The electronic device of claim 2, wherein
    the first electrode includes a first opening and a second opening that is spaced apart in the first direction from the first opening, and
    the second electrode includes a first sensing pattern in the first opening, a second sensing pattern in the second opening, and a bridge pattern electrically connected to the first sensing pattern and the second sensing pattern.

5. The electronic device of claim 4, wherein
    the first sensing pattern and the second sensing pattern are on a same layer as the first electrode, and
    each of the first sensing pattern and the second sensing pattern is surrounded by the first electrode.

6. The electronic device of claim 4, wherein
    the signal generation circuit is configured to provide the first electrode with the signal,
    the touch detection circuit is configured to obtain the touch coordinate based on a detection signal received from the first cross electrode, and
    the input-device detection circuit is configured to obtain the input-device coordinate based on a first detection signal received from the second electrode and a second detection signal received from the first cross electrode.

7. The electronic device of claim 6, wherein the second electrode is electrically floated or grounded in response to the touch detection circuit operating.

8. The electronic device of claim 6, wherein the first electrode is electrically floated or grounded in response to the input-device detection circuit operating.

9. The electronic device of claim 4, wherein
a plurality of openings are defined in each of the first cross electrode and the second cross electrode, and
a dummy pattern is in each of the plurality of openings, and the dummy pattern is electrically floated.

10. The electronic device of claim 4, wherein
the first cross electrode includes a first cross opening and a second cross opening that is spaced apart in the second direction from the first cross opening, and
the second cross electrode includes a first cross sensing pattern in the first cross opening, a second cross sensing pattern in the second cross opening, and a cross bridge pattern electrically connected to the first cross sensing pattern and the second cross sensing pattern.

11. The electronic device of claim 10, wherein
the signal generation circuit is configured to provide the first electrode with the signal,
the touch detection circuit is configured to obtain the touch coordinate based on a detection signal received from the first cross electrode, and
the input-device detection circuit is configured to obtain the input-device coordinate based on a first detection signal received from the second electrode and a second detection signal received from the second cross electrode.

12. The electronic device of claim 11, wherein
in response to the touch detection circuit operating, each of the second electrode and the second cross electrode is electrically floated or grounded, and
in response to the input-device detection circuit operating, each of the first electrode and the first cross electrode is electrically floated or grounded.

13. The electronic device of claim 2, wherein
the first cross electrode includes a first cross opening and a second cross opening that is spaced apart in the second direction from the first cross opening, and
the second cross electrode includes a first cross sensing pattern in the first cross opening, a second cross sensing pattern in the second cross opening, and a cross bridge pattern electrically connected to the first cross sensing pattern and the second cross sensing pattern.

14. The electronic device of claim 13, wherein
the signal generation circuit is configured to provide the first electrode with the signal,
the touch detection circuit is configured to obtain the touch coordinate based on a detection signal received from the first cross electrode, and
the input-device detection circuit is configured to obtain the input-device coordinate based on a first detection signal received from the first electrode and a second detection signal received from the second cross electrode.

15. The electronic device of claim 14, wherein
in response to the touch detection circuit operating, the second cross electrode is electrically floated or grounded, and
in response to the input-device detection circuit operating, the first cross electrode is electrically floated or grounded.

16. The electronic device of claim 1, wherein
the first electrode and the second electrode are symmetrical with each other about a first reference line that extends along the first direction, and
the first cross electrode and the second cross electrode are symmetrical with each other about a second reference line that extends along the second direction.

17. The electronic device of claim 1, wherein, when viewed in a thickness direction of the sensor layer,
the second electrode is surrounded by the first electrode, and
the second cross electrode is surrounded by the first cross electrode.

18. An electronic device, comprising:
a display layer;
a sensor layer on the display layer and including a first electrode that extends along a first direction, a second electrode that extends along the first direction, a first cross electrode that extends along a second direction intersecting the first direction, and a second cross electrode that extends along the second direction; and
a sensor control circuit including a signal generation circuit configured to provide the sensor layer with a signal, a touch detection circuit configured to obtain a touch coordinate based on a touch detection signal provided from the sensor layer, and an input-device detection circuit configured to obtain an input-device coordinate based on a pen detection signal provided from the sensor layer,
wherein the touch detection circuit is configured to obtain the touch coordinate by receiving a detection signal received from at least one selected from the first cross electrode and the second cross electrode, and
wherein the input-device detection circuit is configured to obtain the input-device coordinate based on a detection signal received from at least one selected from the first electrode and the second electrode and a detection signal received from at least one selected from the first cross electrode and the second cross electrode, and
wherein the touch detection circuit is configured to obtain the touch coordinate by summing a first detection signal received from the first cross electrode with a second detection signal received from the second cross electrode.

19. The electronic device of claim 18, wherein
the signal generation circuit is configured to concurrently provide a same signal to the first electrode and the second electrode,
and
the input-device detection circuit is configured to obtain the input-device coordinate based on the detection signal received from each of the first electrode, the second electrode, the first cross electrode, and the second cross electrode.

20. The electronic device of claim 18, wherein
the signal generation circuit is configured to provide the first electrode with the signal,
the touch detection circuit is configured to obtain the touch coordinate based on the detection signal received from the first cross electrode,
the input-device detection circuit is configured to obtain the input-device coordinate based on the detection signal received from each of the second electrode and the second cross electrode,
in response to the touch detection circuit receiving the detection signal from the first cross electrode, the second electrode and the second cross electrode are electrically floated or grounded, and
in response to the input-device detection circuit receiving the detection signal from each of the second electrode and the second cross electrode, the first electrode and the first cross electrode are electrically floated or grounded.

21. The electronic device of claim 18, wherein
the signal generation circuit is configured to concurrently provide the signal to the first electrode and the second electrode,
the touch detection circuit is configured to obtain the touch coordinate by receiving the detection signal from the first cross electrode,
the input-device detection circuit is configured to obtain the input-device coordinate based on the detection signal received from each of the first electrode, the second electrode, and the second cross electrode,
in response to the touch detection circuit receiving the detection signal from the first cross electrode, the second cross electrode is electrically floated or grounded,
in response to the input-device detection circuit receiving the detection signal from each of the first electrode, the second electrode, and the second cross electrode, the first cross electrode is electrically floated or grounded,
the second electrode is spaced apart in the second direction from the first electrode, and
the second cross electrode is surrounded by the first cross electrode.

22. The electronic device of claim 18, wherein
the signal generation circuit is configured to provide the first electrode with the signal,
the touch detection circuit is configured to obtain the touch coordinate by receiving the detection signal received from each of the first cross electrode and the second cross electrode,
the input-device detection circuit is configured to obtain the input-device coordinate based on the detection signal received from each of the second electrode, the first cross electrode, and the second cross electrode,
in response to the touch detection circuit receiving the detection signal from each of the first cross electrode and the second cross electrode, the second electrode is electrically floated or grounded,
in response to the input-device detection circuit receiving the detection signal from each of the second electrode, the first cross electrode, and the second cross electrode, the first electrode is electrically floated or grounded,
the second cross electrode is spaced apart in the first direction from the first cross electrode, and
the second electrode is surrounded by the first electrode.

\* \* \* \* \*